US009838746B2

(12) United States Patent
Long et al.

(10) Patent No.: US 9,838,746 B2
(45) Date of Patent: Dec. 5, 2017

(54) MEDIA CLIP SYSTEMS AND METHODS

(71) Applicant: Verizon Patent and Licensing Inc., Arlington, VA (US)

(72) Inventors: James A. Long, Los Gatos, CA (US); Si Ying Diana Hu, Sunnyvale, CA (US); Joaquin A. Delgado, Fremont, CA (US); Oliver Wagner, Albuquerque, NM (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 35 days.

(21) Appl. No.: 14/813,352

(22) Filed: Jul. 30, 2015

(65) Prior Publication Data
US 2017/0032821 A1 Feb. 2, 2017

(51) Int. Cl.
| | | |
|---|---|---|
| *H04N 9/80* | (2006.01) |
| *H04N 21/4788* | (2011.01) |
| *G11B 27/031* | (2006.01) |
| *G11B 27/30* | (2006.01) |
| *G11B 27/34* | (2006.01) |
| *H04N 21/433* | (2011.01) |
| *H04N 21/472* | (2011.01) |
| *H04N 21/8549* | (2011.01) |
| *H04N 21/845* | (2011.01) |
| *G06F 3/0482* | (2013.01) |
| *G06F 3/0484* | (2013.01) |
| *H04N 21/414* | (2011.01) |
| *H04N 21/431* | (2011.01) |
| *H04N 21/45* | (2011.01) |
| *H04N 21/482* | (2011.01) |
| *H04N 21/63* | (2011.01) |
| *H04N 21/81* | (2011.01) |

(52) U.S. Cl.
CPC ....... *H04N 21/4788* (2013.01); *G06F 3/0482* (2013.01); *G06F 3/04842* (2013.01); *G11B 27/031* (2013.01); *G11B 27/30* (2013.01); *G11B 27/34* (2013.01); *H04N 21/41407* (2013.01); *H04N 21/4316* (2013.01); *H04N 21/4334* (2013.01); *H04N 21/4532* (2013.01); *H04N 21/47217* (2013.01); *H04N 21/482* (2013.01); *H04N 21/632* (2013.01); *H04N 21/8153* (2013.01); *H04N 21/8455* (2013.01); *H04N 21/8549* (2013.01)

(58) Field of Classification Search
CPC .............................. G11B 27/031; G11B 27/30
USPC ........................................................ 386/241
See application file for complete search history.

(56) References Cited

U.S. PATENT DOCUMENTS

| | | | |
|---|---|---|---|
| 2008/0195956 A1 | 8/2008 | Baron et al. |
| 2008/0271098 A1 | 10/2008 | Kalaboukis |
| 2011/0211802 A1* | 9/2011 | Kamada | G11B 27/034 386/201 |
| 2012/0148215 A1* | 6/2012 | Kennedy | H04N 5/76 386/278 |
| 2012/0253942 A1 | 10/2012 | Garfinkle et al. |
| 2014/0101570 A1 | 4/2014 | Bilinski et al. |

(Continued)

Primary Examiner — Hung Dang
Assistant Examiner — Girumsew Wendmagegn

(57) ABSTRACT

Exemplary media clip systems and methods provide end users of a media distribution service, such as a mobile television distribution service, with one or more media clip tools for creation, editing, sharing, accessing, and/or consumption of clips of media programs distributed by way of the media distribution service.

20 Claims, 19 Drawing Sheets

(56) References Cited

U.S. PATENT DOCUMENTS

2015/0074700 A1\* 3/2015 Danovitz ........... H04N 21/4826
                                                                725/14
2016/0259496 A1\* 9/2016 Butcher ................ G06F 3/0488

\* cited by examiner

MEDIA CLIP SYSTEMS AND METHODS

BACKGROUND INFORMATION

Certain media distribution services allow end users of the services to use personal mobile devices to discover, access, and consume a wide variety of media programs. The wide variety of media programs made available by way of such services may make it difficult or inconvenient for end users of the services to discover media content that is of interest to the users. In addition, consumption of media programs with a personal mobile device is often a solitary experience not conducive to the social interaction that has been traditionally available to users who consume media programs with a communal media player device such as a television. Thus, there is a need for improved tools for media discovery and/or end user interaction in a media distribution service that would provide end users of the media distribution service with better user experiences, particularly for end users who use personal mobile devices to consume media programs and enjoy expressing themselves.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Exemplary media clip systems and methods are described herein. Exemplary systems and methods described herein may provide end users of a media distribution service with one or more media clip tools for intuitive and/or convenient creation, editing, sharing, accessing, and/or consumption of clips of media programs distributed by way of the media distribution service. The media clip tools may facilitate interaction between end users of the media distribution service, which may help the end users to express themselves to one another, enjoy social interaction related to media content, and/or otherwise interact with one another within the context of the media distribution service. Additionally or alternatively, the media clip tools may facilitate intuitive and/or convenient sharing of clips of media programs between end users of the media distribution service, which may provide a way for end users to conveniently discover media content that is available through the media distribution service and that is of interest to the end users. These and/or other benefits that may be provided by the exemplary systems and methods are described herein.

As used herein, the term "media content" may refer generally to any content that may be accessed and/or presented (e.g., played back) by a media player device for experiencing by a user of the media player device. The term "media content program" as used herein may refer generally to any instance of media content such as a television program, on-demand media program, pay-per-view media program, broadcast media program (e.g., broadcast television program), multicast media program, narrowcast media program, IPTV program, video program, audio program, streamed media program (e.g., streamed video, audio, and/or audio/video program), recorded live transmission of a media program (e.g., a recorded broadcast, multicast, or narrowcast transmission of the media program), advertisement, and any other distinct instance of media content that may be accessed and/or presented by a media content player device. As used herein, a "clip" or "moment" of a media program may include any continuous segment portion of the media program.

Examples of media clip systems and methods, as well as exemplary media clip tools provided by the systems and methods will now be described in reference to the accompanying drawings.

Figure 1:
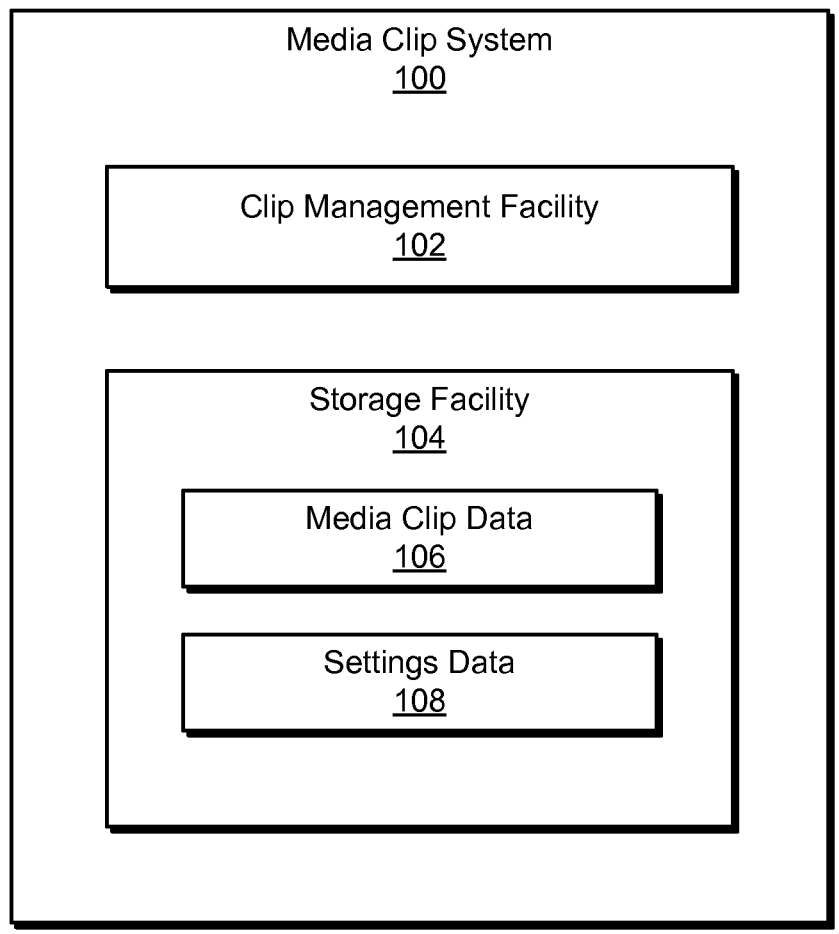
FIG. 1 illustrates an exemplary media clip system according to principles described herein.

FIG. 1 illustrates an exemplary media clip system 100 ("system 100"). As shown, system 100 may include, without limitation, a clip management facility 102 and a storage facility 104 selectively and communicatively coupled to one another. It will be recognized that although facilities 102-104 are shown to be separate facilities in FIG. 1, any of facilities 102-104 may be combined into fewer facilities, such as into a single facility, or divided into more facilities as may serve a particular implementation. Facilities 102-104 of system 100 may include or be otherwise implemented by one or more physical computing devices. In such implementations, system 100 may be referred to as a computer-implemented system 100.

Storage facility 104 may be configured to store data generated and/or used by clip management facility 102. For example, storage facility 104 may store media clip data 106 representative of one or more clips of one or more media programs and settings data 108 representative of one or more settings for use by clip management facility 102 in performing media clip operations. Storage facility 104 may store additional or alternative data as may serve a particular implementation.

The data stored by storage facility 104 may be accessed by system 100 from any suitable source, including a source internal or external to system 100. Thus, while storage facility 104 is shown to be within system 100 in FIG. 1, in alternative embodiments, storage facility 104 may be external of system 100.

Storage facility 104 may permanently or temporarily store data. In certain examples, system 100 may access certain data from a source external to system 100 and temporarily store the data in storage facility 104 for use by clip management facility 102. In certain examples, data generated by clip management facility 102 may be stored permanently or temporarily to storage facility 104.

Clip management facility 102 may perform any of the media clip operations described herein. For example, clip management facility 102 may provide one or more media clip tools for use by end users of a media distribution service to create, edit, manage, share, access, and/or consume clips of media programs distributed by way of the media distribution service. Clip management facility 102 may detect user input received through user interaction with the media clip tools and perform one or more media clip operations in response to the user input. Examples of media clip tools that may be provided by clip management facility 102, as well as operations that may be performed by clip management facility 102 in relation to the tools, such as in response to user interaction with the tools, will now be described.

In certain examples, clip management facility 102 may provide one or more media clip tools by providing a user interface and/or features of a user interface for use by end users of the media distribution service to create, edit, manage, share, access, and/or consume clips of media programs distributed by way of the media distribution service. Exemplary graphical user interfaces ("GUIs") and media clip features of the GUIs will now be described.

Figure 2:
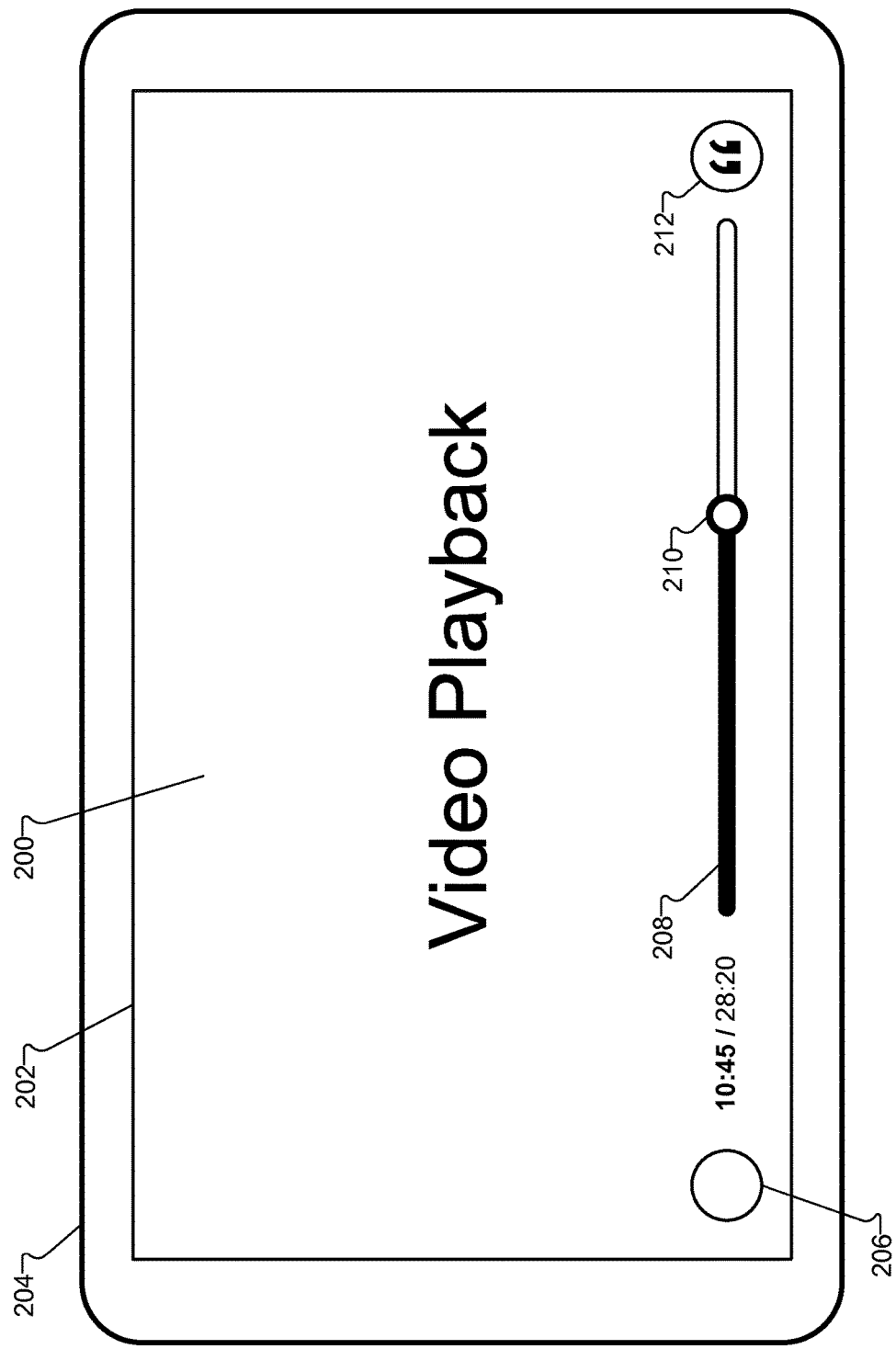
FIG. 2 illustrates an exemplary graphical user interface view according to principles described herein.

FIG. 2 illustrates a GUI view 200 that may be displayed on a display screen 202 of a media player device 204. Clip management facility 102 may provide GUI view 200 and/or one or more features of GUI view 200 for display by media player device 204.

Media player device 204 may include any computing device configured to access and present (e.g., play back) media content for experiencing by a user of the media player device 204. For example, media player device 204 may include a personal mobile device such as a smartphone device, a tablet computer, etc. Alternatively, media player device 204 may include other devices capable of accessing and presenting media content, such as a personal computer, a set-top box device, a television, a media service access device, a media streaming access device, and/or any other suitable device.

Media player device 204 may include an integrated display screen (e.g., display screen 202) such as a touchscreen on which video content may be presented. In other examples, media player device 204 may provide video content for presentation on a separate, communicatively coupled display device (e.g., a television or computer monitor). Additionally or alternatively, media player device 204 may include or be communicatively coupled to audio speakers and provide audio content to the speakers for presentation to the user.

Clip management facility 102 may provide one or more media clip creation tools for use by a user of a media player device to define a clip of a media program. To illustrate, video content of a media program may be played back in GUI view 200, as shown in FIG. 2. GUI view 200 may also include user selectable options such as a menu button 206 selectable by the user to access a menu view, a playback time bar 208 representative of a playback time duration of the media program being played back, and a playback time indicator 210 indicating a current playback time of the playback of the media program.

Clip management facility 102 may provide a clip creation button 212 in GUI view 200. The user may select clip creation button 212 to request that a clip of the media program be created. Clip management facility 102 may detect the user request to create a clip of the media program in any suitable way and, in response, may create a clip of the media program.

Clip management facility 102 may create a clip of the media program in any suitable way. In certain examples, clip management facility 102 may create a clip of the media program automatically in response to a single user input such as a single user selection of clip creation button 212 during playback of the media program. Accordingly, during playback of the media program, the user may define a clip of the media program conveniently and efficiently by selecting the clip creation button 212 at a desired playback time.

To illustrate, in response to a user selection of clip creation button 212 during playback of the media program, clip management facility 102 may automatically create a clip of the media program by determining a playback time of the media program at which the user request is detected, selecting a start time for the clip based on the playback time of the media program at which the user request is detected and on a predefined automatic start time selection setting, selecting an end time for the clip based on the playback time of the media program at which the user request is detected and on a predefined automatic end time selection setting, and generating data representative of the clip. Examples of how clip management facility 102 may perform these operations will now be described.

Clip management facility 102 may determine a playback time of the media program at which the user request is detected in any suitable way. For example, clip management facility 102 may interface with a media player application executing on media player device 204 to query a current playback time position of the playback of the media program. As another example, clip management facility 102 may detect and use a timestamp at which the user request is received to determine a playback position that corresponds to the timestamp. As another example, clip management facility 102 may query metadata information for the media program, such as index information for the media program, to determine the playback time of the media program at which the user request is detected. The metadata information queried by clip management facility 102 may be algorithmically generated based on one or more video segmentation algorithms for scene or shot transitions, which may be indexed so as to be scalable. This may be performed without manual input of the metadata and/or index information.

Clip management facility 102 may use the determined playback time together with a predefined automatic start time selection setting and a predefined automatic end time selection setting to automatically select a start time and an end time for the clip. To illustrate, in certain examples, the predefined start time selection setting may specify a first predefined length of time by which to advance, from the determined playback time, backward in time along the playback timeline of the media program, and the predefined automatic start time selection setting may specify a second predefined length of playback time by which to advance, from the determined playback time, forward in time along the playback timeline of the media program. In such examples, clip management facility 102 may select a start time for the clip by advancing, from the playback time, backward along the playback timeline by the first predefined length of playback time and designating the identified time as the start time for the clip. Clip management facility 102 may also select an end time for the clip by advancing, from the playback time, forward along the playback timeline by the second predefined length of playback time and designating the identified time as the end time for the clip.

Figure 3:
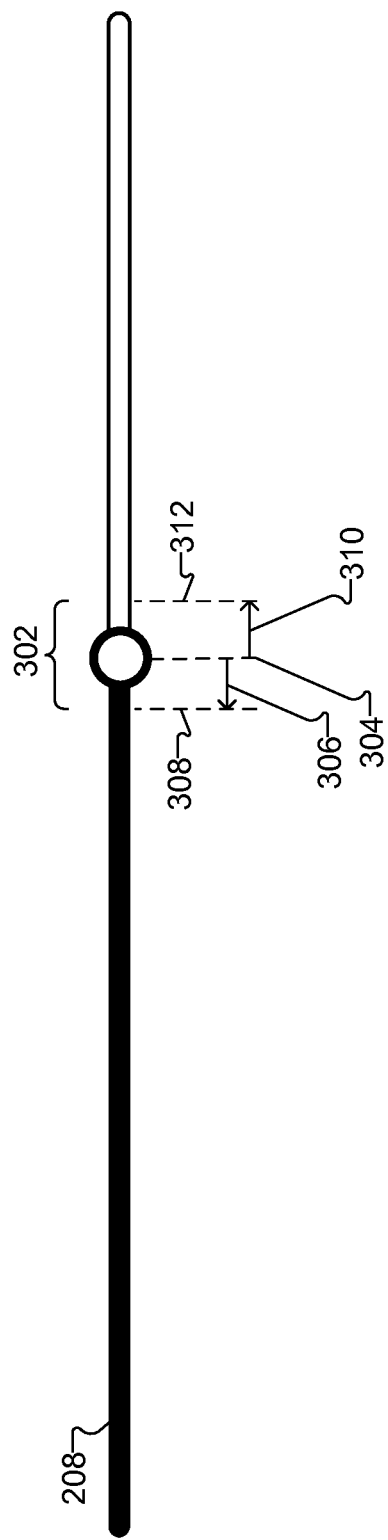
FIGS. 3-5 illustrate examples of automatic creation of clips of a media program according to principles described herein.

FIG. 3 illustrates an example of an automatic creation of a clip 302 of a media program based on a determined playback time and on first and second predefined lengths of time specified by the predefined automatic start and end time selection settings. Dashed line 304 represents a determined playback time, within a playback of the media program represented by playback time bar 208, at which a user request to create a media clip is detected. From the determined playback time, clip management facility 102 may advance backward in time along the playback timeline of the media program by the first predefined length of time, as represented by arrow 306, to identify a start time of the media clip, which start time is represented by dashed line 308. Similarly, from the determined playback time, clip management facility 102 may advance forward in time along the playback timeline of the media program by the second predefined length of time, as represented by arrow 310, to identify an end time of the media clip, which end time is represented by dashed line 312.

The first and second predefined lengths of time may be defined to be any lengths of time suitable for generating media clips. In certain examples, the first and second lengths of time may be defined to be equal lengths of time (e.g., five seconds each). In other examples, the first and second lengths of time may be defined to be different lengths of time. For example, the first length of time (e.g., twenty seconds) may be of longer duration than the second length of time (e.g., ten seconds) to favor automatic generation of media clips that contain more playback content that is earlier in time from when the user selects the clip creation button 212 compared to the playback content that is later in time from when the user selects the clip creation button 212. Conversely, the second length of time (e.g., twenty seconds) may be of longer duration than the first length of time (e.g., ten seconds) to favor automatic generation of media clips that contain more playback content that is later in time from when the user selects the clip creation button 212 compared to the playback content that is earlier in time from when the user selects the clip creation button 212.

In certain examples, the first and second predefined lengths of time may be defined to promote creation of media clips having consistent total lengths of time. For example, the first and second predefined lengths of time may be defined to have a sum total length of thirty seconds.

Additionally or alternatively to the predefined automatic start and end time selection settings specifying predefined lengths of times, the predefined automatic start and end time selection settings may comprise one or more scene boundary selection settings usable by clip management facility 102 to identify scene boundaries in a media program and to designate identified scene boundaries as start and end times of a media clip. As used herein, a "scene boundary" may include a playback time that corresponds to a start of a particular scene of a media program, an end of a particular scene of a media program, or a transition from one scene to another in a media program. In certain examples, the predefined automatic start time selection setting may comprise a start scene boundary selection setting usable to identify a start scene boundary in the media program that is earlier in time than the playback time of the media program at which the user request to create a clip of the media program is detected, and the predefined automatic end time selection setting may comprise an end scene boundary selection setting usable to identify an end scene boundary in the media program that is later in time than the playback time of the media program at which the user request to create a clip of the media program is detected.

In certain such examples, clip management facility 102 may select a start time for the clip by advancing, from the playback time, backward along the playback timeline to identify, based on the start scene boundary selection setting, a scene boundary in the media program that is earlier in time than the determined playback time and designating the identified scene boundary as the start time for the clip. Clip management facility 102 may also select an end time for the clip by advancing, from the playback time, forward along the playback timeline to identify, based on the end scene boundary selection setting, a scene boundary in the media program that is later in time than the determined playback time and designating the identified scene boundary as the end time for the clip.

Clip management facility 102 may use the start and end scene boundary selection settings to identify scene boundaries in any suitable way. In certain examples, clip management facility 102 may analyze the media program (e.g., by analyzing a stream of data that represents the media program, metadata for the media program, etc.) based on scene boundary selection settings to identify a point in the media program that has one or more attributes indicative of a scene boundary. To illustrate, a media program or a media stream carrying the media program may include one or more attributes that are indicative of a change of scenes at a particular point in the media program. Such attributes may be indicative of common properties of scene changes, such as fade-ins, fade-outs, audio gaps, video gaps, audio volume changes, etc. Clip management facility 102 may use scene boundary settings to search for and identify attributes indicative of such properties and, from these identified properties, identify scene boundaries in the media program. Examples of attributes that may be indicative of scene changes and/or properties of scene changes may include, without limitation, changes in brightness, contrast, and/or saturation values between video frames, types of video frames (e.g., "I" frames), changes in audio levels and/or properties between frames, and types of audio frames that are indicative of properties of scene changes.

In certain examples, the predefined scene boundary settings may direct clip management facility 102 to identify a boundary scene that immediately precedes the determined playback time and to designate that boundary scene as the start time for the media clip. Similarly, the predefined scene boundary settings may direct clip management facility 102 to identify a boundary scene that immediately follows the determined playback time and to designate that boundary scene as the end time for the media clip.

Figure 4:
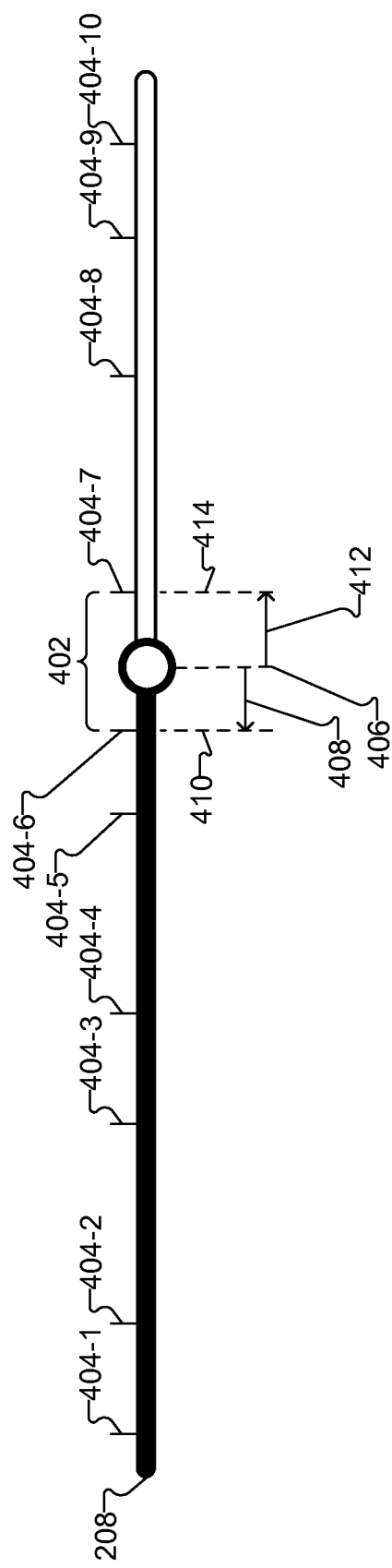

FIG. 4 illustrates an example of an automatic creation of a clip 402 of a media program based on a determined playback time and on predefined scene boundary selection settings. In FIG. 4, lines 404 (e.g., lines 404-1 through 404-10) represent scene boundaries along a playback timeline of a media program represented by playback time bar 208. Dashed line 406 represents a determined playback time, within a playback of the media program represented by playback time bar 208, at which a user request to create a media clip is detected.

From the determined playback time, clip management facility 102 may advance backward in time along the playback timeline of the media program in search of a scene boundary immediately preceding the determined playback time, as represented by arrow 408. Clip management facility 102 may identify scene boundary 404-6 and designate a playback time corresponding to the scene boundary 404-6 (e.g., the playback time at which a scene of the media program bounded by scene boundary 404-6 and scene boundary 404-7 starts) as the start time of the media clip, which start time is represented by dashed line 410.

Similarly, from the determined playback time, clip management facility 102 may advance forward in time along the playback timeline of the media program in search of a scene boundary immediately following the determined playback time, as represented by arrow 412. Clip management facility 102 may identify scene boundary 404-7 and designate a playback time corresponding to the scene boundary 404-7 (e.g., the playback time at which a scene of the media program bounded by scene boundary 404-6 and scene boundary 404-7 ends) as the end time of the media clip, which end time is represented by dashed line 414.

In certain examples, metadata for a media program may include data indicating scene boundaries within the media program. For example, a provider of the media distribution service may process a media program to identify scene boundaries in the media program. The provider may insert markers (e.g., index information) for the scenes into metadata for the media program. In such examples, clip management facility 102 may use the metadata scene boundary markers to identify scene boundaries based on the predefined start and end scene boundary selection settings. The pre-processing and marking of a media program with scene boundary markers may promote more efficient operation of clip management facility 102 in identifying and designating scene boundaries as start and end times of a media clip in response to a user request to create a media clip.

In certain examples, the predefined automatic start and end time selection settings may specify time limits, such as a maximum total length of time for a media clip or for advancing backward or forward along the timeline of the media program to select a start time and/or an end time for the media clip. In such examples, if clip management facility 102 does not identify a scene boundary before reaching a maximum length of playback time threshold, clip management facility 102 may identify and designate a start time and/or end time of a media clip (e.g., at playback times that correspond to the maximum thresholds) without identifying and using a start scene boundary and/or an end scene boundary for the start time and/or the end time.

Figure 5:
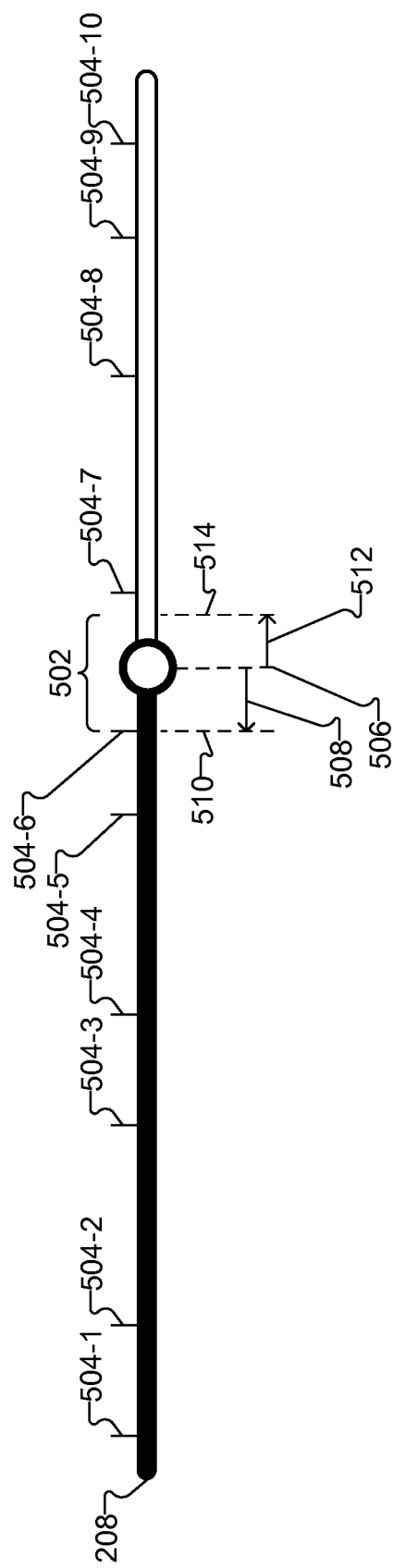

FIG. 5 illustrates an example of an automatic creation of a clip 502 of a media program based on a determined playback time and on predefined scene boundary selection settings and maximum time threshold settings. In FIG. 5, lines 504 (e.g., lines 504-1 through 504-10) represent scene boundaries along a playback timeline of a media program represented by playback time bar 208. Dashed line 506 represents a determined playback time, within a playback of the media program represented by playback time bar 208, at which a user request to create a media clip is detected.

From the determined playback time, clip management facility 102 may advance backward in time along the playback timeline of the media program in search of a scene boundary immediately preceding the determined playback time, as represented by arrow 508. Clip management facility 102 may identify scene boundary 504-6 and designate a playback time corresponding to the scene boundary 504-6 (e.g., the playback time at which a scene of the media program bounded by scene boundary 504-6 and scene boundary 504-7 starts) as the start time of the media clip, which start time is represented by dashed line 510.

Similarly, from the determined playback time, clip management facility 102 may advance forward in time along the playback timeline of the media program in search of a scene boundary immediately following the determined playback time, as represented by arrow 512. Before reaching scene boundary 504-7, clip management facility 102 may determine that a predefined maximum time threshold for the clip has been reached and may identify and designate an end time for the media clip based on the predefined maximum time threshold, which end time is represented by dashed line 514.

In certain examples, the predefined automatic start and end time selection settings may be defined by a provider of the media distribution service. For instance, predefined lengths of time by which to advance from a determined playback time may be hard coded or otherwise fixed in settings data 108 and/or clip management facility 102. In other examples, the predefined automatic start and end time selection settings may be custom defined by an end user of the media distribution service. To this end, clip management facility 102 may provide one or more media clip tools for use by the end user to define one or more of the predefined automatic start and end time selection settings. For example, clip management facility 102 may provide one or more tools for use by the end user to custom define lengths of time to be used by clip management facility 102 to identify clip start and end times (e.g., lengths of time to advance forward and/or backward along a media program timeline, maximum clip length thresholds, etc.) and/or scene boundary selection settings to be used by clip management facility 102 to identify clip start and end times. In certain examples, the predefined automatic start and end time selection settings may include a combination of provider-defined and end-user-defined settings.

After selecting start and end times for the media clip, clip management facility 102 may generate data representative of the media clip that is usable by a media player device to access and play back the clip of the media program. The data representative of the media clip may be in any format suitable for use by the media player device, and clip management facility 102 may generate the data in any suitable way.

In certain examples, clip management facility 102 may generate the data representative of a media clip of a media program to specify an identifier for the media program and offsets for the start and end times of the media clip. The offsets may be defined relative to a start, an end, or other suitable reference point of the media program. Such data may allow a media player device to use the identifier to identify a media program asset maintained by a provider of the media distribution service (e.g., a live television media program or an on-demand media program asset maintained in a content data network) and to use the offsets to identify particular playback times of the media program at which to start and stop a playback of the clip. The offsets may be used by the media player device to index directly to the start and end times within the media program asset (to start and stop streaming at the start and end times). The use of this data representative of a media clip may help conserve computing resources by allowing a media program asset already maintained by the provider of the media distribution service to be used for access to clips of the media program without additional permanent copies of the clips of the media program having to be stored in memory.

In certain examples, after generating data representative of a media clip, clip management facility 102 may automatically save the data representative of the media clip to a user profile of an end user who requested the clip be created. The user profile may be associated with an account of the end user with the media distribution service. In certain examples, the user profile may be maintained by a provider of the media distribution service and may include information about the end user, service access credentials for the end user (e.g., subscription credentials), device information for one or more computing devices (e.g., media player devices) used by the user to access the media distribution service, service settings for the end user, historical information about interaction of the end user with the media distribution service, and/or any other information associated with the end user and the media distribution service.

Figure 6:
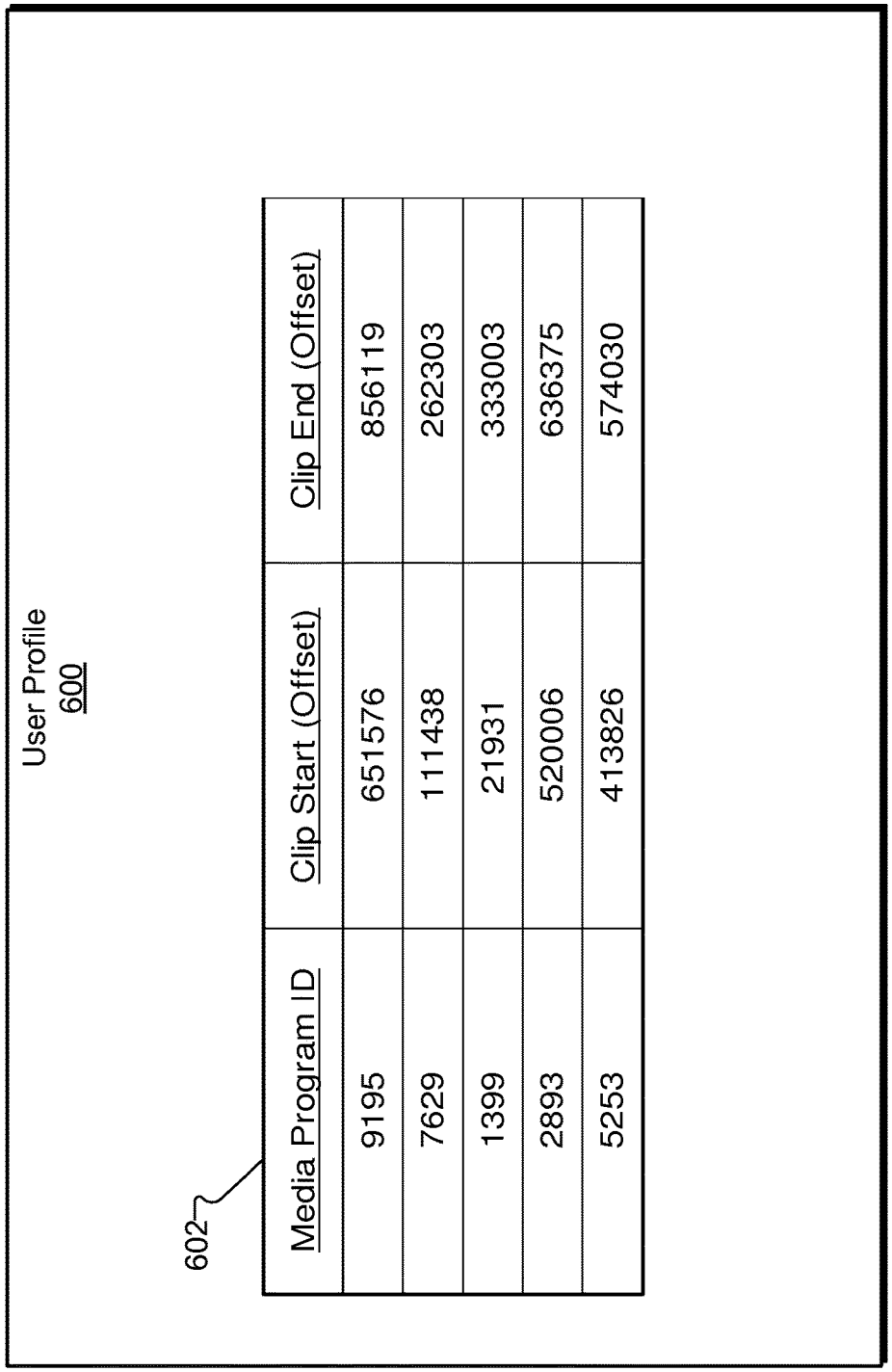
FIG. 6 illustrates an exemplary user profile for an end user of a media distribution service according to principles described herein.

By automatically saving data representative of the media clip to the user profile, clip management facility 102 may maintain historical data for all media clips created by the end user. This data may be accessible by the user and/or shareable by the user, as described further below. FIG. 6 illustrates an exemplary user profile 600 for an end user of the media distribution service. As shown, user profile 600 may include a table 602 of data representative of media clips defined by the end user. In the illustrated example, table 602 includes a media program identifier ("media program ID"), a start-time index offset, and an end-time index offset for each media clip saved to user profile 600.

After clip management facility 102 creates a media clip, clip management facility 102 may provide a notification to the user who requested creation of the media clip. For example, in response to the media clip being created as described above, clip management facility 102 may provide a notification for display in a GUI view to indicate to the user of media player device 204 that the media clip has been created.

Figure 7:
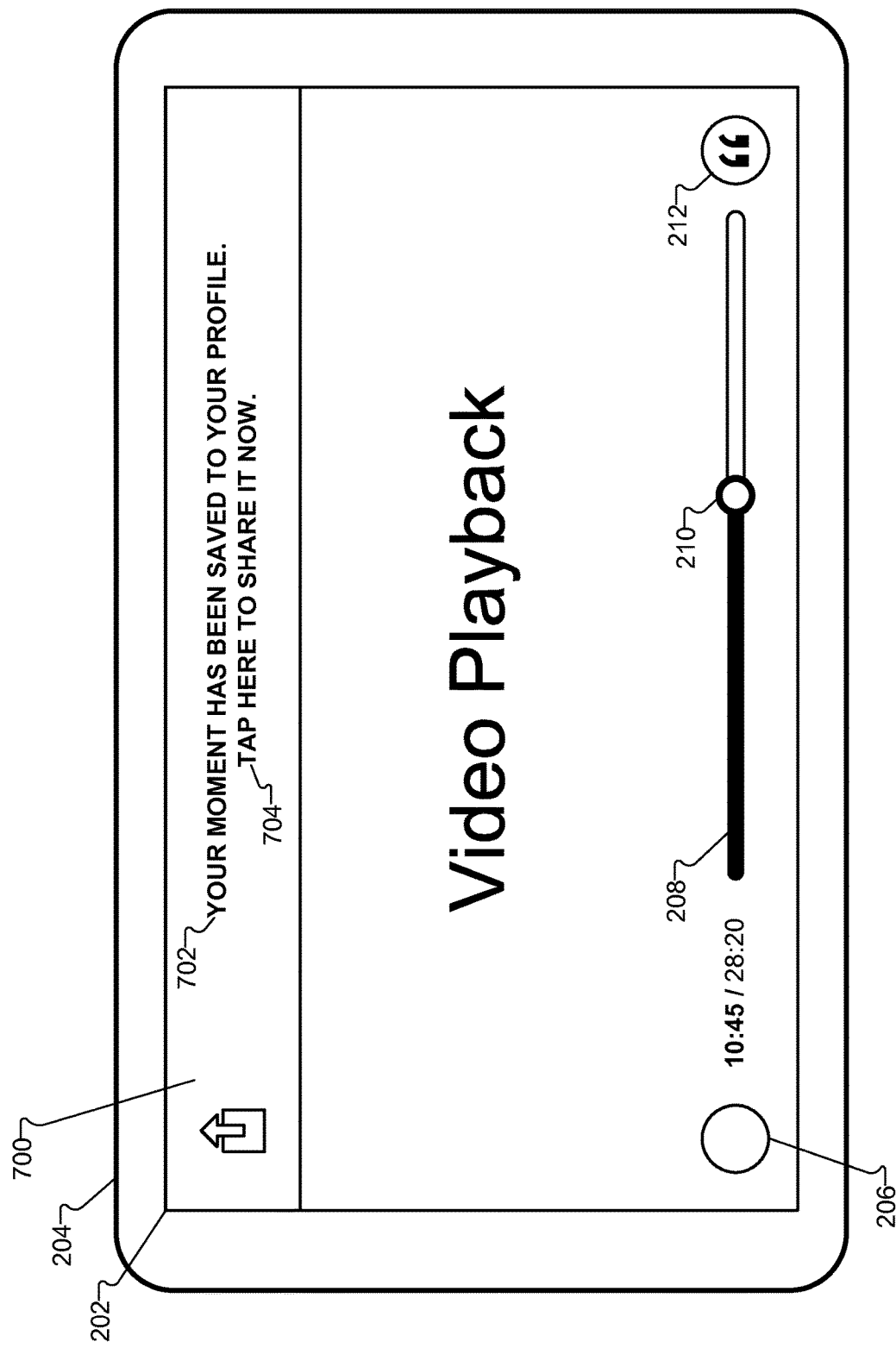
FIGS. 7-14 illustrate exemplary graphical user interface views according to principles described herein.

FIG. 7 illustrates a GUI view 700 that may be displayed on display screen 202 of media player device 204. Clip management facility 102 may provide GUI view 700 and/or one or more features of GUI view 700 for display by media player device 204. For example, clip management facility 102 may provide a notification 702 in GUI view 700 that indicates that a media clip has been saved to the user profile of the user who requested that the media clip be created.

After clip management facility 102 creates a media clip, clip management facility 102 may provide a user selectable option to share the media clip. For example, in response to the media clip being created as described above, clip management facility 102 may provide a user selectable option for display in a GUI view to indicate to the user of media player device 204 that the user may select the option to share the media clip.

For example, clip management facility 102 may provide a user selectable option 704 to share the media clip in GUI view 700, as shown in FIG. 7. As illustrated, clip management facility 102 may provide both notification 702 and option 704 concurrently in GUI view 700, such as in a header area of GUI view 700.

If the user does not select option 704 within a predefined length of time, clip management facility 102 may remove notification 702 and option 704 from GUI view 700, thereby allowing the user to continue consuming the media program uninterrupted. As described herein, clip management facility 102 may provide one or more media clip sharing tools for use by the user to share the created media at a later time (e.g., after the user finishes consuming the media program).

If the user provides input to select option 704 (e.g., a single user input to select option 704), clip management facility 102 may detect the selection of option 704 and respond by performing one or more media clip operations to facilitate editing and/or sharing of the media clip. In certain examples, clip management facility 102 may perform one or more operations to share the media clip with one or more other people in accordance with a predefined automatic media clip sharing setting. For instance, clip management facility 102 may automatically send, in response to the user selection of share option 704, data representative of the media clip to devices associated with one or more other people by way of one or more preselected media communication platforms. In this manner, the user may conveniently share the clip with a single user input (e.g., after creating the clip with another single user input).

In other examples, clip management facility 102 may provide one or more media clip tools for use by the user to edit and/or share the media clip. Examples of such tools will now be described.

Figure 8:
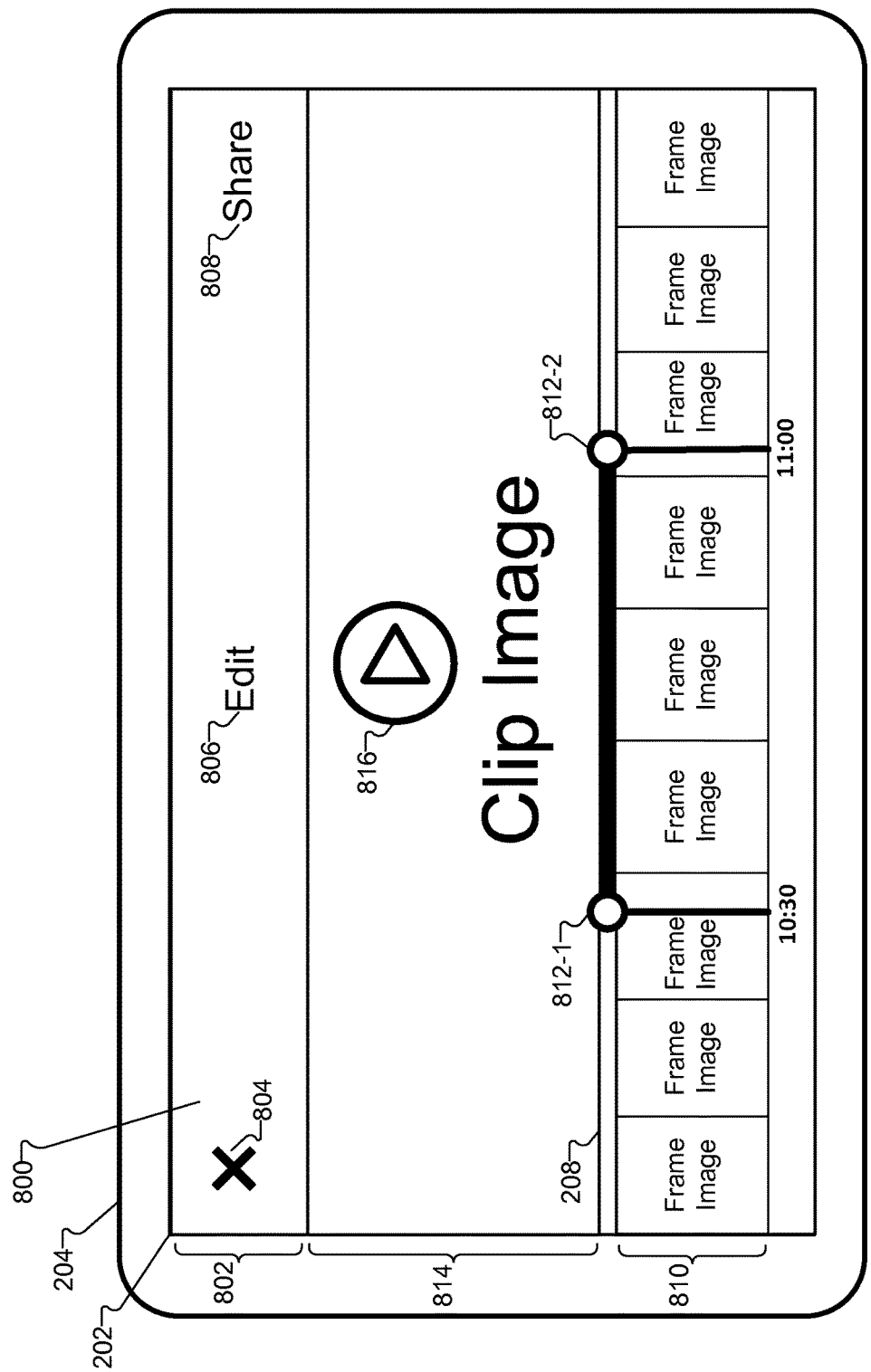

FIG. 8 illustrates an exemplary GUI view 800 that may be displayed in response to a user selection of option 704. Clip management facility 102 may provide GUI view 800 and/or one or more features, such as one or more clip editing features, of GUI view 800 for display by media player device 204.

As shown, GUI view 800 may include a header area 802 that includes an option 804 for returning to a playback view of the media program (e.g., to return to GUI view 200), an option 806 for launching media clip editing features (which is the currently selected option in FIG. 8), and an option 808 for sharing the media clip. A user may utilize one or more media clip sharing features shown in FIG. 8 to edit the created media clip prior to selecting option 808 to share the media clip.

GUI view 800 may also include a frame image array 810, which may be a horizontal, linear array of still-frame images of the media program. Still images of select frames of the media program may be displayed linearly in chronological order in the array 810.

The frame image array 810 may be displayed in conjunction with a portion of the playback time bar 208 of the media program. For example, the array 810 and the time bar 208 may be parallel rows stretching horizontally across GUI view 800 as shown in FIG. 8.

GUI view 800 may include handles 812 (e.g., handles 812-1 and 812-2) for use by the user to edit the media clip. Each of the handles 812 may be movable by a user along the time bar 208 and/or the frame image array 810. A user may provide input to select and drag handle 812-1 horizontally along the time bar 208 and/or the frame image array 810 to adjust the start time of the media clip and/or to select and drag handle 812-2 horizontally along the time bar 208 and/or the frame image array 810 to adjust the end time of the media clip. Any suitable user input may be used to select and drag the handles 812, such as touch screen user input on a touchscreen.

Handles 812 may be graphically overlaid on time bar 208 and/or frame image array 810. In FIG. 8, for example, each of the handles includes a circular graphical object overlaid on time bar 208 and a vertical line extending away from the circular graphical object such that the vertical line is overlaid on frame image array 810. The portion of the time bar 208 and the frame images of the array 810 that are positioned between the handles 812 may visually represent the media clip. This may help the user readily ascertain how the start time and/or end time of the media clip relate to the playback timeline and/or the frames of the media program.

In certain examples, clip management facility 102 may graphically "rubber band" handles 812 one to another. That is, clip management facility 102 may graphically limit a playback time length between the start time handle 812-1 and the end time handle 812-2 to prevent the playback time length between the start time handle 812-1 and the end time handle 812-2 from exceeding a maximum media clip playback time threshold (e.g., thirty seconds). If the user provides input to move one of the handles 812 too far from the other of the handles 812, clip management facility 102 may perform one or more remedial actions. For example, clip management facility 102 may animate a rubber band effect that causes one of the handles 812 to move back toward the other of the handles 812 such that the playback time length between the handles 812 does not exceed the threshold. This "rubber banding" effect may be applied by clip management facility 102 to either of the handles 812 (e.g., to the handle 812 that was moved by the user or to the other handle 812).

GUI view 800 may also include a playback area 814, which may be disposed between header area 802 and the time bar 208 and frame image array 810 as shown in FIG. 8. The playback area 814 may include a clip image representative of the media clip, which clip image may be a still-frame image selected by clip management facility 102 from the frame images includes in the media clip.

Figure 9:
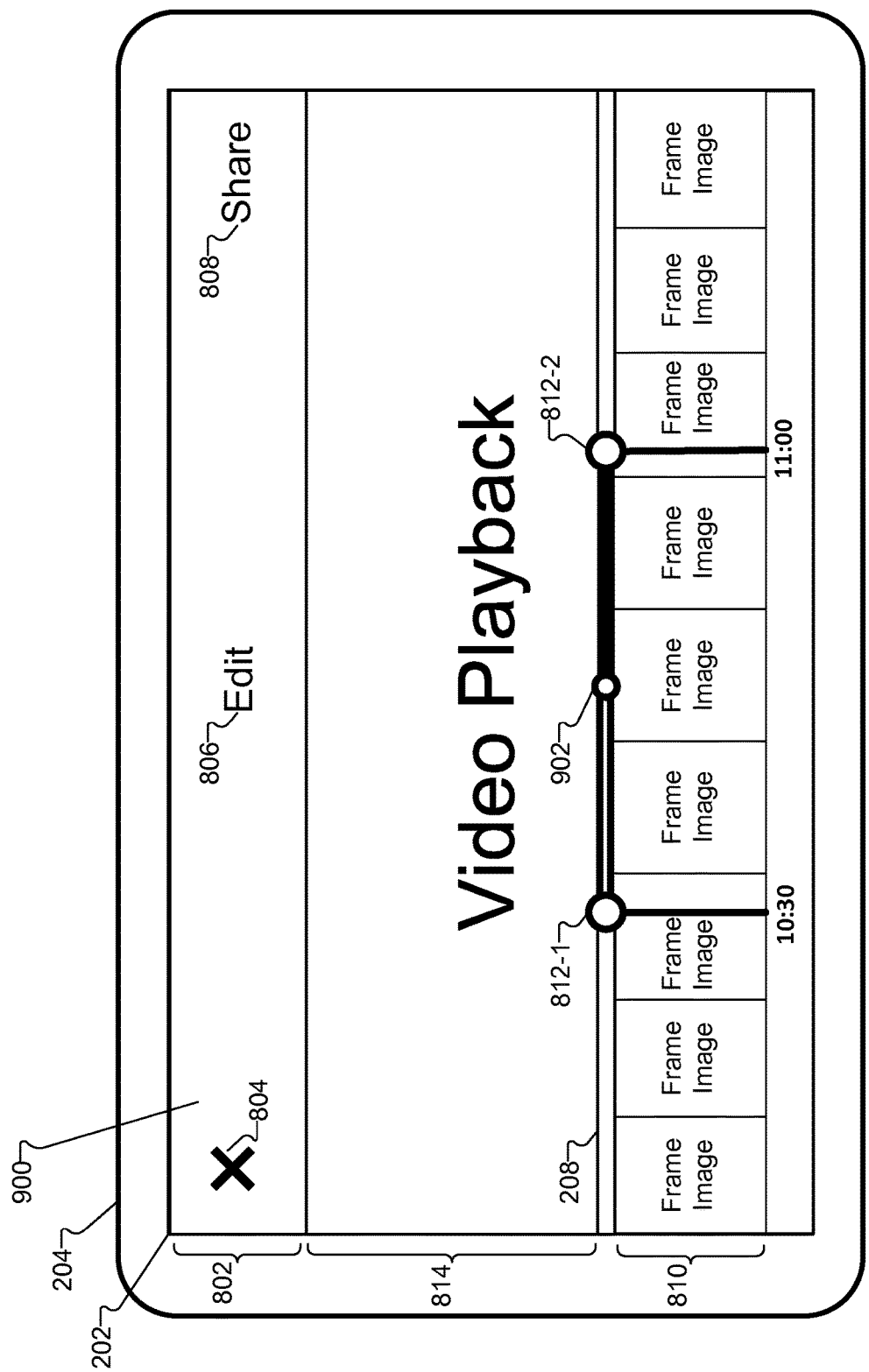

The playback area 814 may include a playback option 816 overlaid on the clip image. The playback option 816 may be selected by the user to initiate a playback of the media clip in the playback area 814 such that the user may preview the media clip before sharing the media clip. FIG. 9 illustrates a GUI view 900 in which the media clip is being played back in the playback area 814 in response to a user selection of playback option 816. As shown, GUI view 900 may include a playback time indicator 902 that visually indicates a current playback time position of the media clip relative to the time bar 208 and/or the frame image array 810.

A user may provide a user request to share a media clip in any suitable way. For example, a user may provide such a request by selecting option 704 in GUI view 700 or option 808 in GUI view 800 or GUI view 900. Clip management facility 102 may detect a user request to share a media clip in any suitable way and, in response, may perform one or more media clip sharing operations. As described above, in certain examples, clip management facility 102 may automatically share a media clip, in response to the user request to share the media clip, based on a predefined media clip sharing setting. In other examples, clip management facility 102 may provide, in response to the user request to share a media clip, one or more media clip sharing tools for use by the user to share the media clip. Examples of such media clip sharing tools will now be described.

Figure 10:
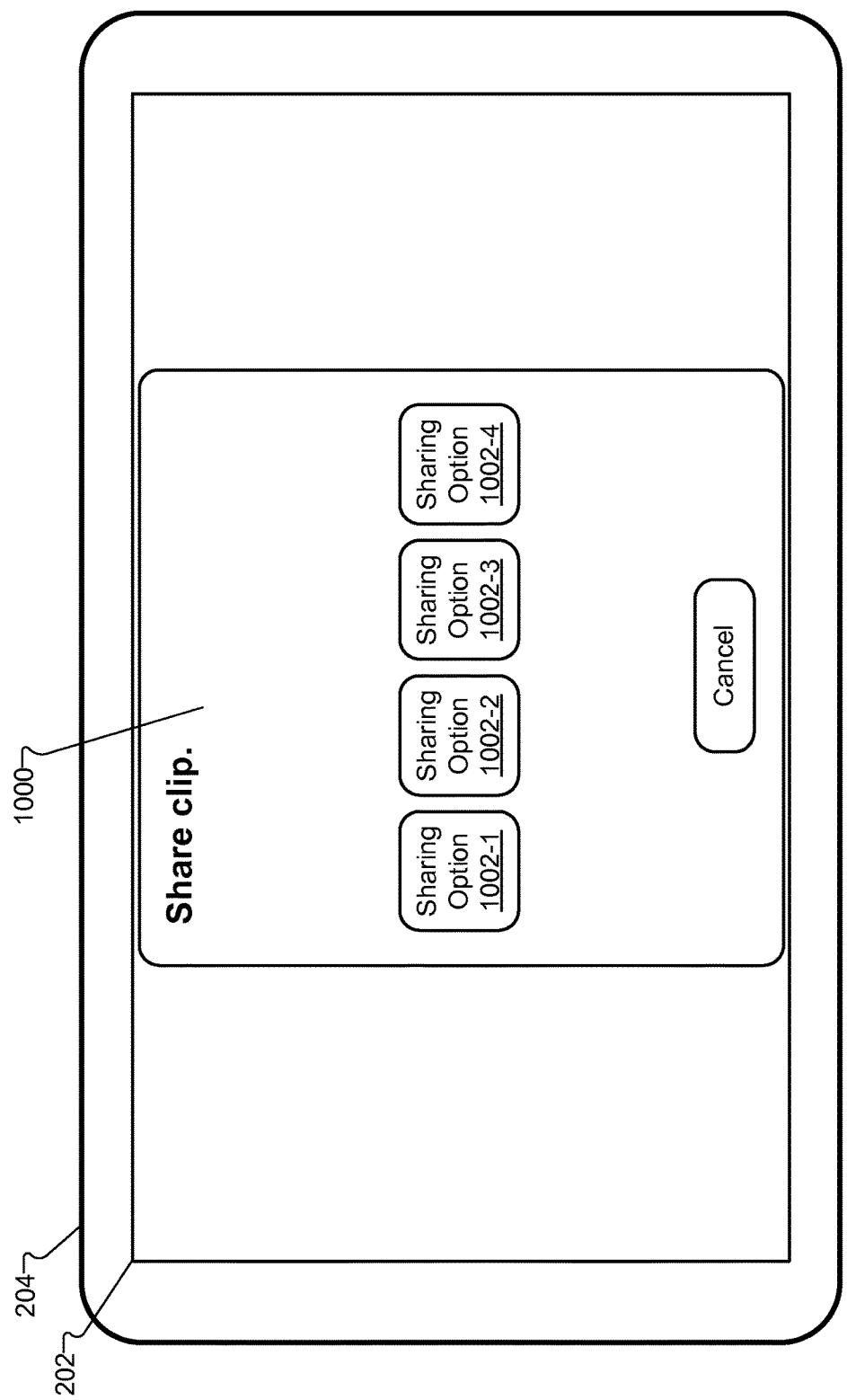

FIG. 10 illustrates an exemplary GUI view 1000 that may be displayed in response to a detection of a user request to share a media clip. Clip management facility 102 may provide GUI view 1000 and/or one or more features, such as one or more clip sharing features, of GUI view 1000 for display by media player device 204.

As shown, GUI view 1000 may include a menu of sharing options 1002 (e.g., sharing options 1002-1 through 1002-4) each selectable by a user to choose a way to share a media clip. In certain examples, sharing options 1002 may represent a set of communication platforms by way of which data representative of a media clip may be sent by the user to one or more other people. Examples of such communication platforms that may be represented by sharing options 1002 may include one or more data communication platforms (e.g., data messaging platforms such as an e-mail platform and/or a text or media messaging platform like a short-messaging service ("SMS") platform and/or a media-messaging service ("MMS") platform) and/or social networking platforms (e.g., TWITTER, FACEBOOK, PINTEREST, etc.) by way of which a media clip may be shared.

The media communication platforms represented by sharing options 1002 may be preselected for representation in GUI view 1000 by a provider of the media distribution service, the end user of the service, or by a manufacturer of media player device 204. In certain examples, features of an operating system running on media player device 204 may be used to provide access to the media communication platforms and to select sharing options 1002 to be included in GUI view 1000.

Figure 11:
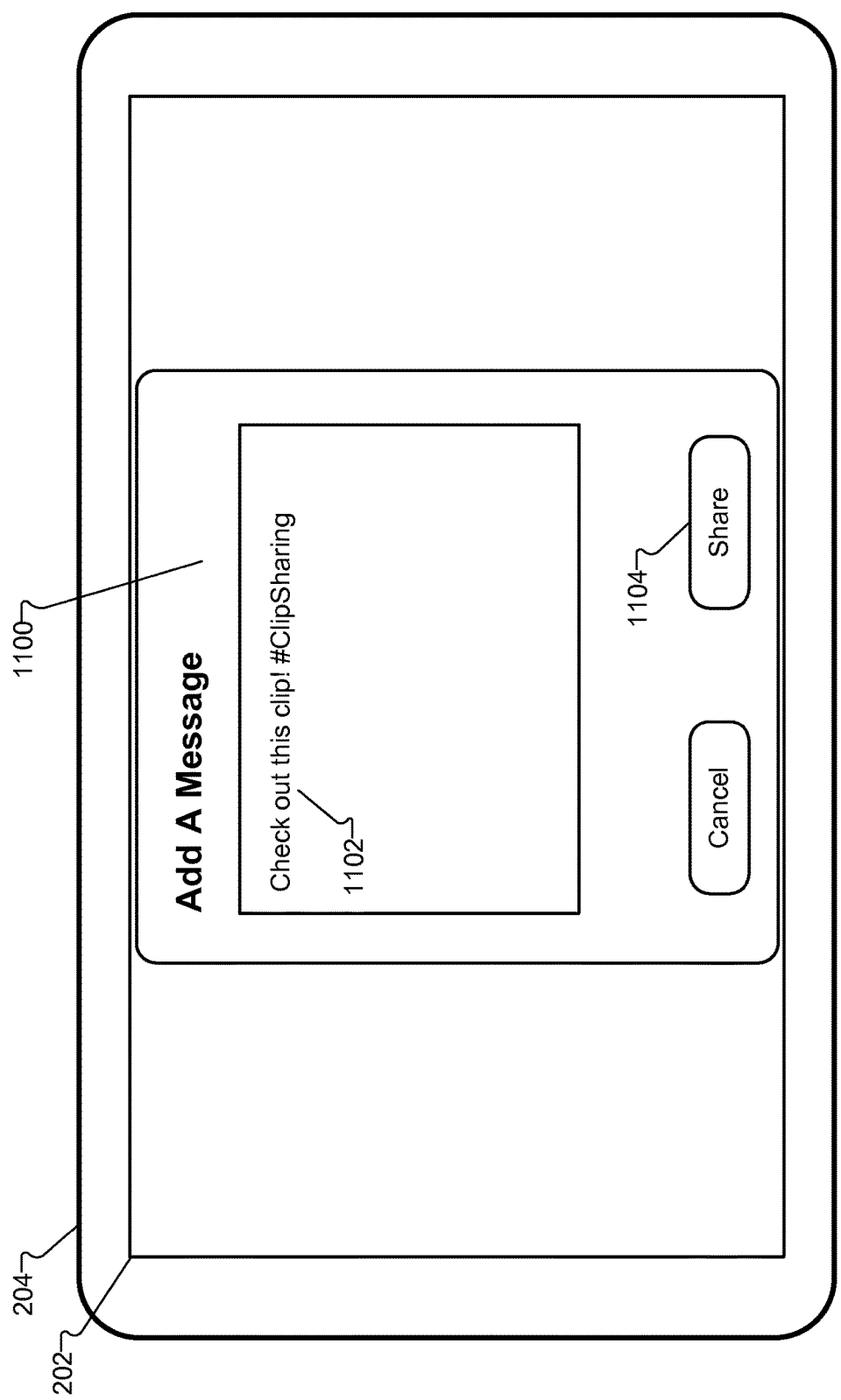

A user may provide input to select one of the sharing options 1002. Clip management facility 102 may detect the user selection and respond by automatically sharing the media clip by way of the media communication platform represented by the selected sharing option 1002. In other examples, before sharing the media clip by way of the media communication platform represented by the selected sharing option 1002, the user may be provided with one or more tools (e.g., a virtual keyboard and text entry field) for creating, modifying, and/or including a textual message with the media clip. For example, in response to a user selection of one of the sharing options 1002, clip management facility 102 may provider a GUI view 1100 shown in FIG. 11 for display. As shown in FIG. 11, GUI view 1100 may include a prepopulated textual message 1102 related to the sharing of the clip. GUI view 1100 may also include one or more tools for use by the user to provide a custom message (e.g., by editing the pre-populated message) to be shared together with the media clip. After choosing a textual message to accompany the media clip, the user may select a share option 1104 to share the media clip and accompanying message with one or more other people by way of the selected media communication platform. In response to the selection of share option 1104, data representative of the media clip and the accompanying message is sent to the one or more other people by way of the selected media communication platform.

After the media clip has been shared, clip management facility 102 may provide a notification to the user who requested that the media clip be shared. For example, in response to the media clip being shared as described above, clip management facility 102 may provide a notification for display in a GUI view to indicate to the user of media player device 204 that the media clip has been shared.

Figure 12:
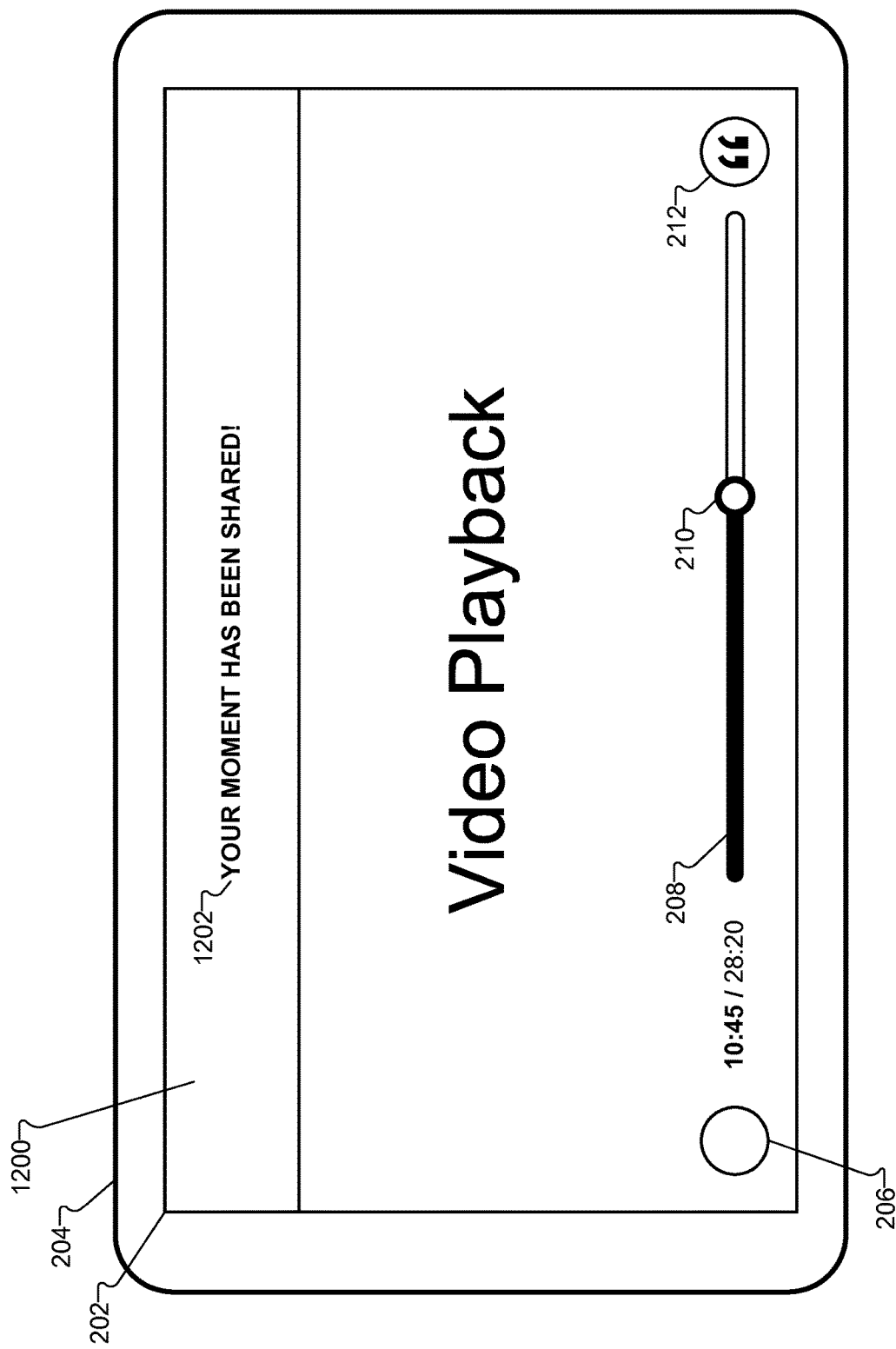

FIG. 12 illustrates a GUI view 1200 that may be displayed on display screen 202 of media player device 204. Clip management facility 102 may provide GUI view 1200 and/or one or more features of GUI view 1200 for display by media player device 204. For example, clip management facility 102 may provide a notification 1202 in GUI view 1200 that indicates that a media clip has been shared. The notification 1202 may be displayed together with automatically continued playback of the media program, as shown in FIG. 12. Alternatively, the notification 1202 may be displayed together with a frame image of the media program that represents that the playback of the media program has been paused at the playback time at which the user requested that the media clip be created, and a selectable option to resume playback may be overlaid on the frame image. The user may select the option to resume playback of the media program starting at the playback time at which the user requested that the media clip be created.

A recipient of a shared media clip may access and consume the media clip in any suitable way. For example, a media player device operated by the recipient may use data representative of the shared media clip to request and stream the media clip from the provider of the media distribution service. The media player device may utilize a web browser, a media player application, a media service application, or any other media access technologies to access and play back the shared media clip.

The sharing of media clips, as described herein, may help one or more users or potential users of the media distribution service to discover, access, and consume media programs that are distributed by way of the media distribution service and that are of interest to the one or more users. The sharing of media clips, as described herein, may also help one or more potential users of the media distribution service to discover and register to be end users of the media distribution service. For example, access to a shared media clip may draw potential users to access and install a media service client application on their media player devices, such as by way of deep linking into the application. Additionally or alternatively, the sharing of media clips, as described herein, may facilitate interaction between end users of the media distribution service, which may provide a way for end users of the media distribution service to express themselves one to another in relation to media programs and/or the media distribution service.

In certain examples, clip management facility 102 may place limits on sharing of media clips. For example, clip management facility 102 may limit the total time of media content that may be shared, such as by imposing a predefined per content percentage limit or a predefined per user percentage limit. Such limits may help to ensure that media content is shared as intended and that the media clip sharing tools are not abused.

As mentioned, a user may define a media clip of a media program during playback of the media program and continue to consume the media program uninterrupted both while the media clip is created and after the media clip is created. The lack of interruption may be due to the ease and speed with which the user is able to define the media clip and/or due to the playback of the media clip being temporarily paused during user definition of the media clip.

The user may access, edit, and/or share the saved media clip at a later time (e.g., after playback of the media program has ended). For example, the user may access a particular view of a media service GUI, which view may include a feed of media clips that have been defined by the user and saved to the user profile for the user. To illustrate one example, a home page view of the media service GUI may include a dashboard view having a section dedicated to representing media clips that have been defined by the user.

Figure 13:
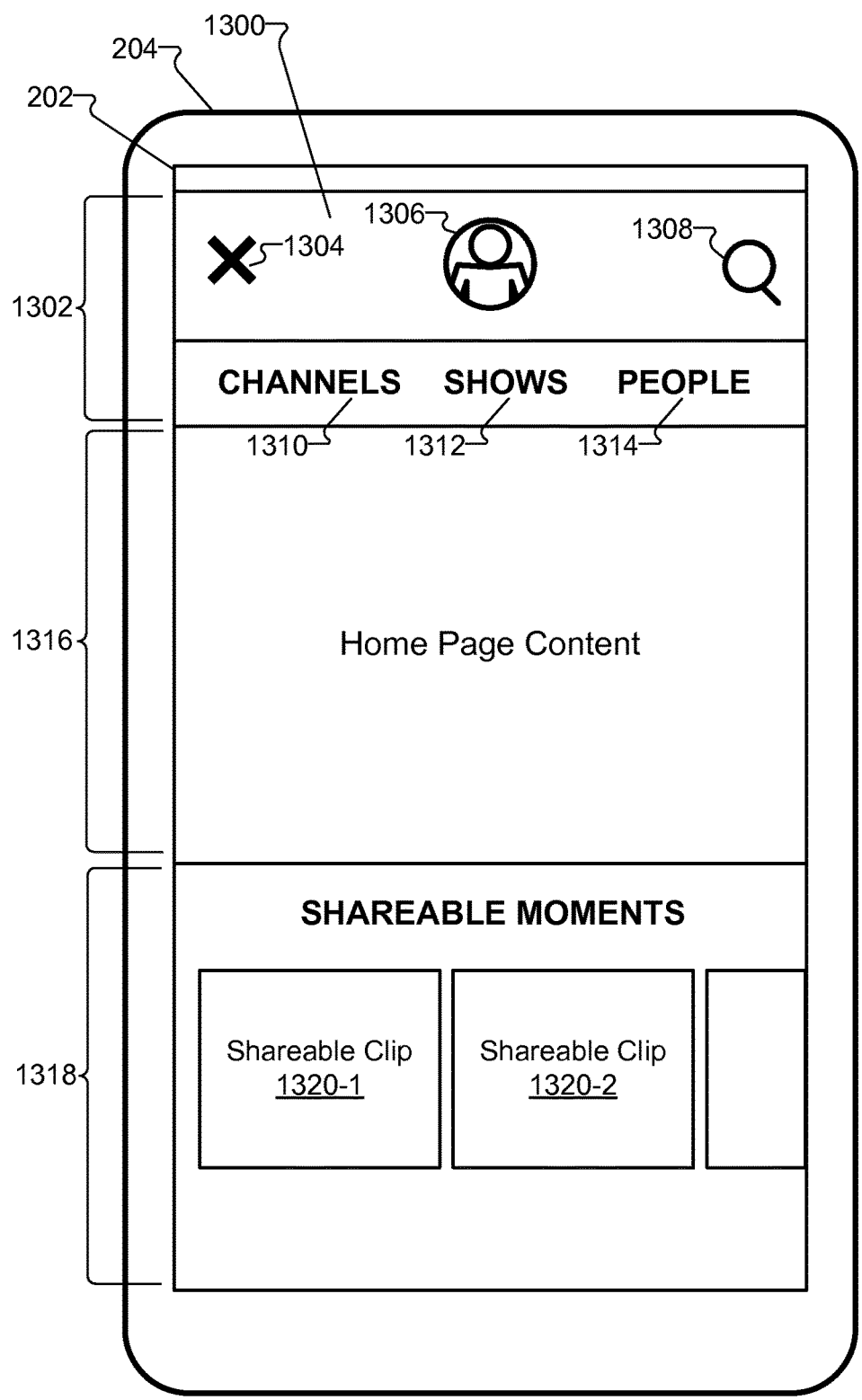

FIG. 13 illustrates an exemplary media service GUI home page view 1300 ("GUI view 1300") that may be displayed on display screen 202 of media player device 204. GUI view 1300 may be a home page of the media distribution service and/or a media service client application running on media player device 204. Clip management facility 102 may provide GUI view 1300 and/or one or more features of GUI view 1300 for display by media player device 204.

As shown, GUI view 1300 may include a menu area 1302 that includes content such as a menu option 1304 for exiting the media service client application, a user profile indicator 1306 (e.g., a photo or avatar for a user), a search option 1308 for searching the media distribution service, a channel option 1310 for accessing media channels (e.g., television channels) that the user is following, a shows option 1312 for accessing media programs (e.g., television series) that the user is following, and a people option 1314 for accessing content (e.g., shared media clips) associated with profiles of end users of the media distribution service that the user is following. User interface content representing the media channels, media programs, or users being followed by the user may be displayed in a home page content area 1316 of GUI view 1300.

GUI view 1300 may also include a media clip area 1318 in which user interface content representing media clips that the user has defined may be displayed. For example, still images 1320 (e.g., still images 1320-1 and 1320-2) may represent media clips that have been defined by the user and are available for the user to access for playback and/or share with one or more other people.

Clip management facility 102 may populate media clip area 1318 by selecting one or more media clips from the user profile for the user and providing still images for the selected media clips for inclusion in media clip area 1318. In certain examples, clip management facility 102 may order the selected media clips in reverse chronological order based on when the media clips were created.

In response to a user selection of a still image 1320 representing a media clip in GUI view 1300, clip management facility 102 may provide another GUI view for display. The other GUI view may include one or more user selectable options for consuming (e.g., playing back), editing, and/or sharing the media clip. Accordingly, the user may conveniently discover a saved media clip and consume, edit, and/or share the saved media clip at any time that is convenient for the user.

The user may also be able to access media clips shared by other end users of the media distribution service. In certain examples, user interface content representing media clips shared by other users may be provided by clip management facility 102 for display in the home page content area 1316 of GUI view 1300. For example, when channels option 1310 is selected, one or more recently shared media clips of media programs provided on media channels followed by the user may be represented in the home page content area 1316 of GUI view 1300. When shows option 1312 is selected, one or more recently shared media clips of media programs followed by the user may be represented in the home page content area 1316 of GUI view 1300. When people option 1314 is selected, one or more media clips recently shared by other users being followed by the user may be represented in the home page content area 1316 of GUI view 1300.

Figure 14:
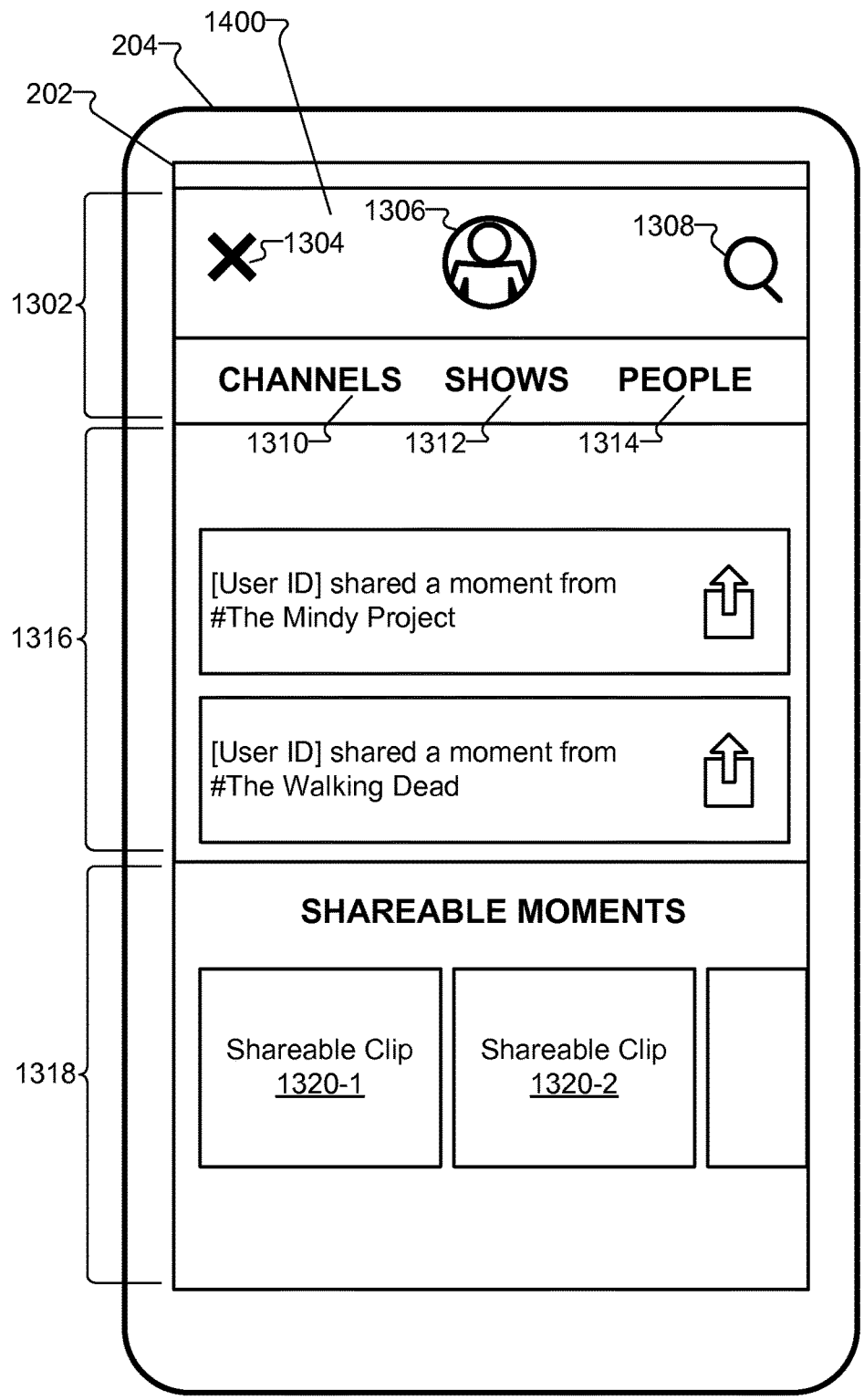

FIG. 14 illustrates an exemplary media service GUI home page view 1400 ("GUI view 1400") that may be displayed on display screen 202 of media player device 204. GUI view 1400 may be a home page of the media distribution service and/or a media service client application running on media player device 204. Clip management facility 102 may provide GUI view 1400 and/or one or more features of GUI view 1400 for display by media player device 204.

As shown, GUI view 1400 may be similar to GUI view 1300 and may include user interface content in the home page content area 1316 that represents media clips that have been shared by other users of the media distribution service. Clip management facility 102 may select the shared media clips for inclusion in GUI view 1400 based on the media clips being shared by users followed by the user, on the media clips being clips of media programs followed by the user, and/or on the media clips being clips of media programs distributed on media channels followed by the user.

Additionally or alternatively to representing media clips in a media service GUI home page view, such as is illustrated in FIG. 13 and FIG. 14, media clips may be represented in other media service GUI views, such as a user profile view of the media service GUI. A user profile view may provide a user with a view of the user's activity with the media service, which activity may include definition of media clips by the user. A user profile view may additionally or alternatively include user interface content that represents media clips shared by other users being followed by the user.

In certain examples, a media service GUI view may include a "trending" display area in which user interface content representing popular media clips is displayed. Clip management facility 102 may receive a request for popular media clips and may responds by identifying popular media clips and providing user interface content representing the identified media clips for inclusion in a GUI view. Clip management facility 102 may determine the popularity of media clips in any suitable way, such as based on clip sharing statistics (e.g., sharing rates, quantity of shares, number of users sharing, etc.) and/or viewing statistics for media programs.

In certain examples, clip management facility 102 may provide one or more media clip tools for use by a user to define a collage of media clips, which collage may be shared and/or consumed as a single entity in any of the ways described herein. For example, clip management facility 102 may provide a tool for use by the user to string together multiple media clips (e.g., media clips previously defined by the user and/or media clips shared by other users) to form a playlist of media clips, such as by dragging graphical objects representing the media clips onto a timeline. Clip management facility 102 may generate and save data representative of the collage of media clips. The data representative of the collage of media clips may be represented as a data entity that is usable by a media player device to access and playback the collage of media clips as a playlist of media clips.

In certain examples, clip management facility 102 may provide one or more media clip tools for use by a user to insert user-generated media content into a collage of media clips. For example, the user may use an appropriately configured user device to record audio/video content of the user providing an introduction, narrative, or other commentary for the media clips (e.g., a "selfie" video of the user). The user may then use the tools to add the recorded content to the collage of media clips in any suitable way.

System 100 may be implemented as may suit a particular application. In certain examples, for instance, system 100 may be implemented as part of and/or in association with a media distribution service such as an on-demand media content service, a television service (e.g., a subscription television service, a "live" or "scheduled" television service that distributes television content in accordance with a schedule defined by a party other than an end user of the service, a "catch-up" television service that provides time-shifted access to live or scheduled television content as a service, a broadcast, multicast, or narrowcast television service, a scheduled television content distribution service, a mobile television distribution service, etc.), a mobile media distribution service that distributes media content for access and play back by personal mobile devices (e.g., a mobile video distribution service), and/or any other media distribution service.

Figure 15:
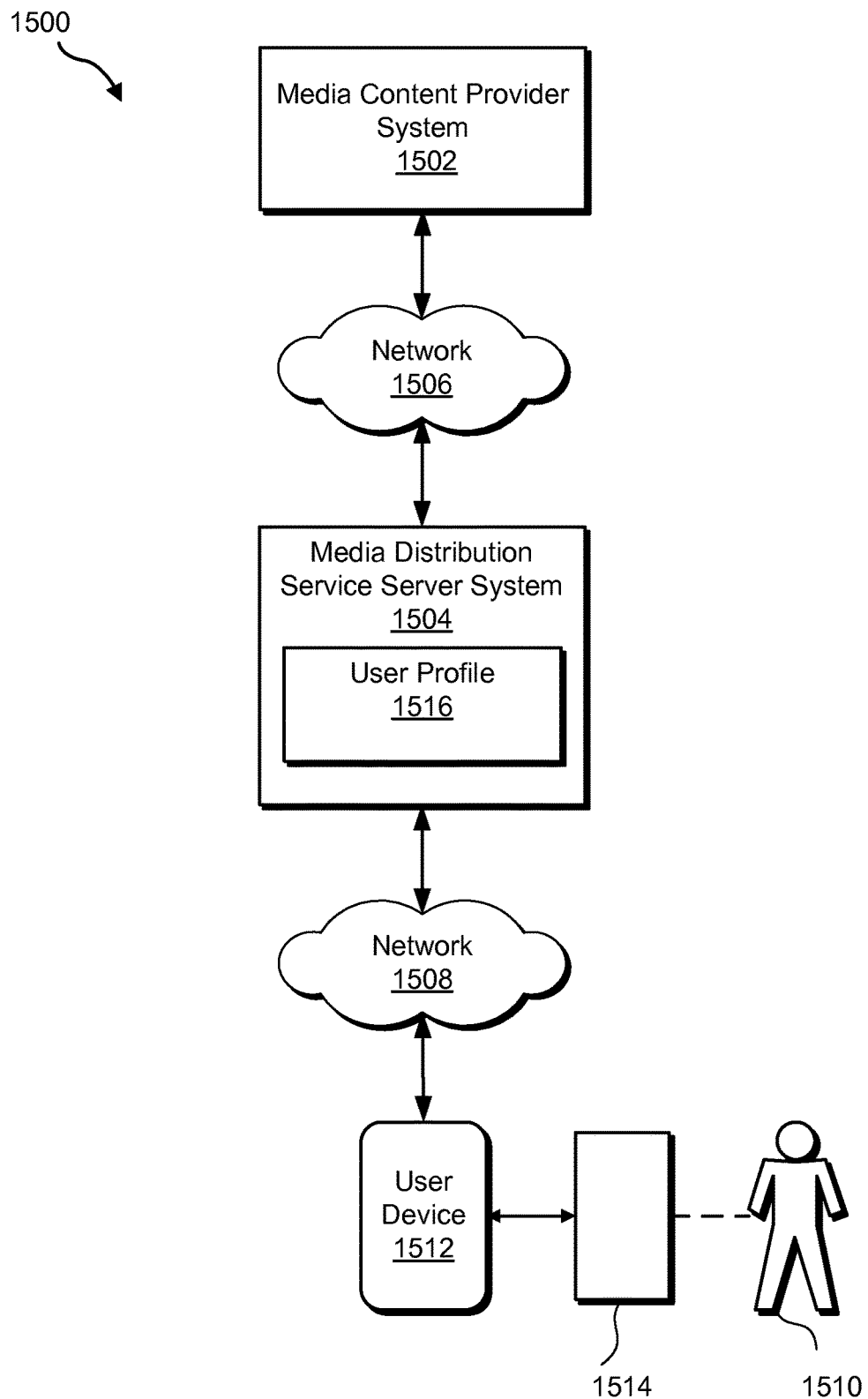
FIG. 15 illustrates an exemplary media distribution service system that implements the media clip system of FIG. 1 according to principles described herein.

FIG. 15 illustrates an exemplary media distribution service system 1500 ("system 1500") that implements system 100. System 1500 may provide a media distribution service, including any of the types of media distribution services described herein. For example, system 1500 may be a mobile television distribution service system that provides a mobile television distribution service. While FIG. 15 illustrates a particular configuration of components of system 1500, other examples may omit one or more illustrated components, include one or more additional components, and/or combine or reconfigure one or more components of system 1500.

As shown in FIG. 15, system 1500 may include a media content provider system 1502 ("provider system 1502") and a media distribution service server system 1504 ("server system 1504") communicatively coupled by way of a network 1506. Provider system 1502 may be associated with (e.g., operated by) a source provider of media content and may provide media content to server system 1504 for distribution by server system 1504 over a network 1508 to one or more end users of a media distribution service.

Server system 1504 may be associated with (e.g., operated by) a provider of a media distribution service. Server system 1504 may include one or more server-side computing devices. Server system 1504 may receive, pre-process, maintain (e.g., in a content data network), and distribute the media content to end users of the media distribution service. An end user 1510 of the media distribution service may use a user device 1512 to access the media distribution service and/or media content distributed by way of the media distribution service. User device 1512 may include any media player device or other computing device configured to communicate with server system 1504 by way of network 1508, access media content distributed by server system 1504, and process and provide the accessed media content for consumption by end user 1510. In certain examples, user device 1512 is a personal mobile device of end user 1510.

Provider system 1502, server system 1504, and user device 1512 may communicate using any communication platforms and technologies suitable for transporting data and/or communication signals. Network 1506 and/or network 1508 may include, but are not limited to, one or more wireless networks (Wi-Fi networks), wireless communication networks, mobile telephone networks (e.g., cellular telephone networks), mobile phone data networks, broadband networks, narrowband networks, the Internet, local area networks, wide area networks, live television transmission networks, and any other networks capable of carrying media content, data, and/or communications signals between user device 1512 and server system 1504 and/or between provider system 1502 and server system 1504. Communications between user device 1512 and server system 1504 or between provider system 1502 and server system 1504 may be transported using any one of the above-listed networks, or any combination or sub-combination of the above-listed networks. Network 1506 and network 1508 may be the same network or separate networks.

Server system 1504 and/or user device 1512 may perform one or more operations to provide the media distribution service to end user 1510. Server system 1504 and/or user device 1512 may provide a media service user interface 1514 through which end user 1510 may interact with the media distribution service. Through media service user interface 1514, end user 1510 may access the media distribution service, such as by accessing one or more features of the media distribution service and/or media content accessible through the media distribution service. In certain examples, media service user interface 1514 may include a graphical user interface provided by server system 1504 and/or user device 1512 for display on a display screen and for use by end user 1510 to interact with the media distribution service. Media service user interface 1514 may be displayed on any suitable display screen accessible by end user 1510, including on a display screen of a display device included in user device 1512 or communicatively connected to user device 1512. Media service user interface 1514 may include any of the exemplary GUI views described herein.

In certain examples, server system 1504 may maintain a media service user profile 1516 for end user 1510. User profile 1516 may be associated with an account of end user 1510 with the media distribution service. User profile may include information about end user 1510, service access credentials for end user 1510 (e.g., subscription credentials), device information for one or more computing devices (e.g., user device 1512) used by end user 1510 to access the media distribution service, service settings for end user 1510, historical information about interaction of end user 1510 with the media distribution service, and/or any other information associated with end user 1510 and the media distribution service. User profile 1516 may also include data representative of media clips defined by end user 1510, as described herein.

Components of system 100 (e.g., facilities 102 and 104) may be implemented entirely by user device 1512 (e.g., as a mobile application or other software application installed on user device 1512), entirely by server system 1504 (e.g., as an application server implemented by server system 1504), or distributed across user device 1512 and server system 1504 (e.g., as a mobile application or other software application installed on user device 1512 and an application server implemented by server system 1504). Accordingly, server system 1504 and/or user device 1512 may perform one or more of the media clip operations described herein.

Server system 1504 may maintain media clip data (e.g., media clip data 106) representative of media clips. The media clip data may include any of the data representative of media clips described herein, such as media program identifiers and offsets. The media clip data may also include user interface content representative of the media clips (e.g., still images representing the media clips). Server system 1504 and/or user device 1512 may use the media clip data to populate media service user interface 1514 with user interface content representative of media clips and/or to access media clips for playback by user device 1512.

In certain examples, server system 1504 may maintain media clip data representative of different types of media clips. For example, server system 1504 may maintain media clip data for media clips defined by one or more end users of the media distribution service, media clip data for media clips defined by a source provider of media content (e.g., a source provider operating provider system 1502), and/or media clip data for media clips defined by a provider of the media distribution service (e.g., a service provider operating server system 1504). Media clips defined by a content provider or a service provider may be referred to as "curated media clips." Examples of such media clips may include, without limitation, promotional clips defined by a content provider (e.g., clips designed to promote media programs provided by the content provider) and/or clips curated by a service provider.

In certain examples, media clips curated by a service provider, such as a provider of a media distribution service, may be curated automatically with no direct user interaction. For example, clip management facility 102, which may be implemented by server system 1504, may algorithmically generate media clips based on metadata information for media programs and without direct user interaction. Clip management facility 102 may utilize any suitable algorithms to automatically generate media clips. As an example, clip management facility 102 may generate media clips based on video segmentation algorithms for scene or shot transitions. Additionally or alternatively, clip management facility 102 may generate media clips based on historical user interactions with media programs, such as by generating media clips based on historical user playback (e.g., playback operations like play, stop, pause, resume, fast forward, rewind, skip, etc.) of media programs and/or historical definition of media clips by end users of a media distribution service. Clip management facility 102 may aggregate and analyze data representative of historical interactions of end user with media programs, and, based on the aggregate data and on predefined algorithms, identify areas of interest in the media programs and/or optimal media clip boundaries in the media programs. From the determined areas of interest and/or optimal media clip boundaries, clip management facility 102 may automatically generate one or more media clips, which may be referred to as candidate media clips. Clip management facility 102 may provide such media clips as recommendations to one or more end users of a media distribution service.

Any of the different types of media clips maintained by server system 1504 may be shared, accessed, and/or consumed in any of the ways described herein. Additionally, any of the different types of media clips maintained by server system 1504 may be represented in media service user interface 1514. For example, a GUI view may include user interface content representing one or more different types of media clips. In certain examples, the user interface content may indicate the type of a media clip represented in a GUI view, such as by indicating a content provider, service provider, or end user who defined the media clip. For instance, for a set of media clips represented in a media clip area of a GUI view (e.g., media clip area 1318 of GUI view 1300), the user interface content may indicate a type or source of each of the media clips.

Figure 16:
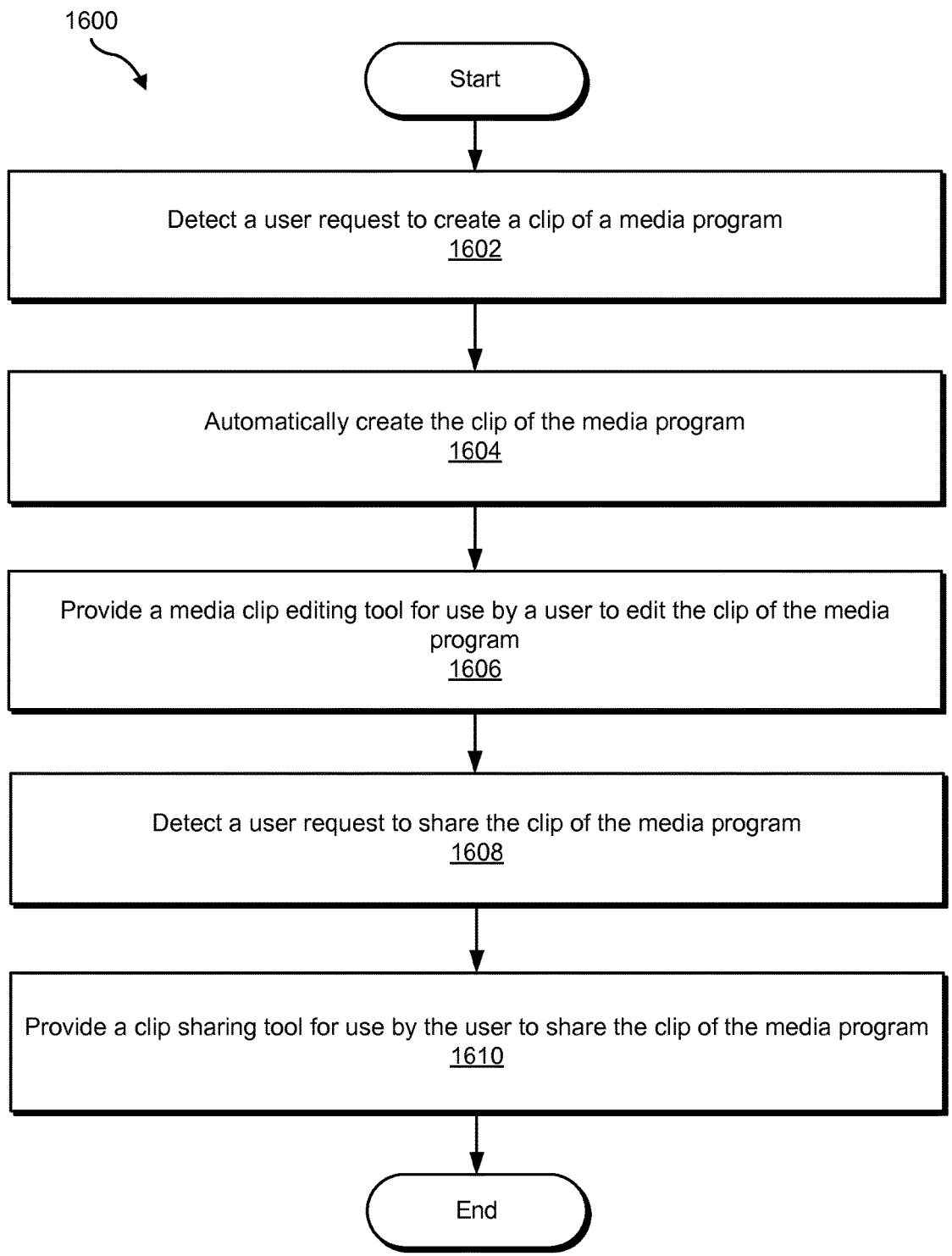
FIGS. 16-18 illustrate exemplary media clip methods according to principles described herein.
Figure 17:
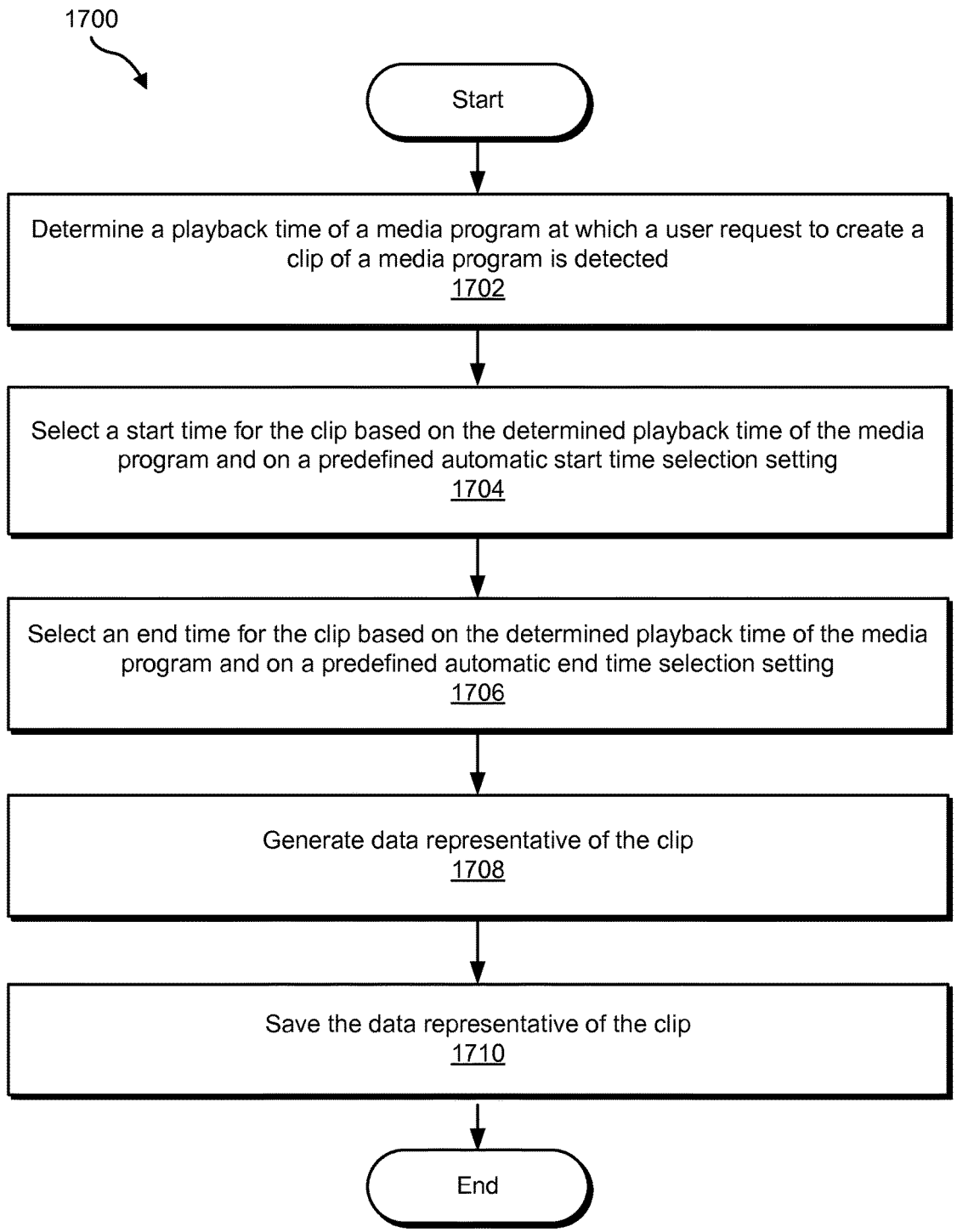
Figure 18:
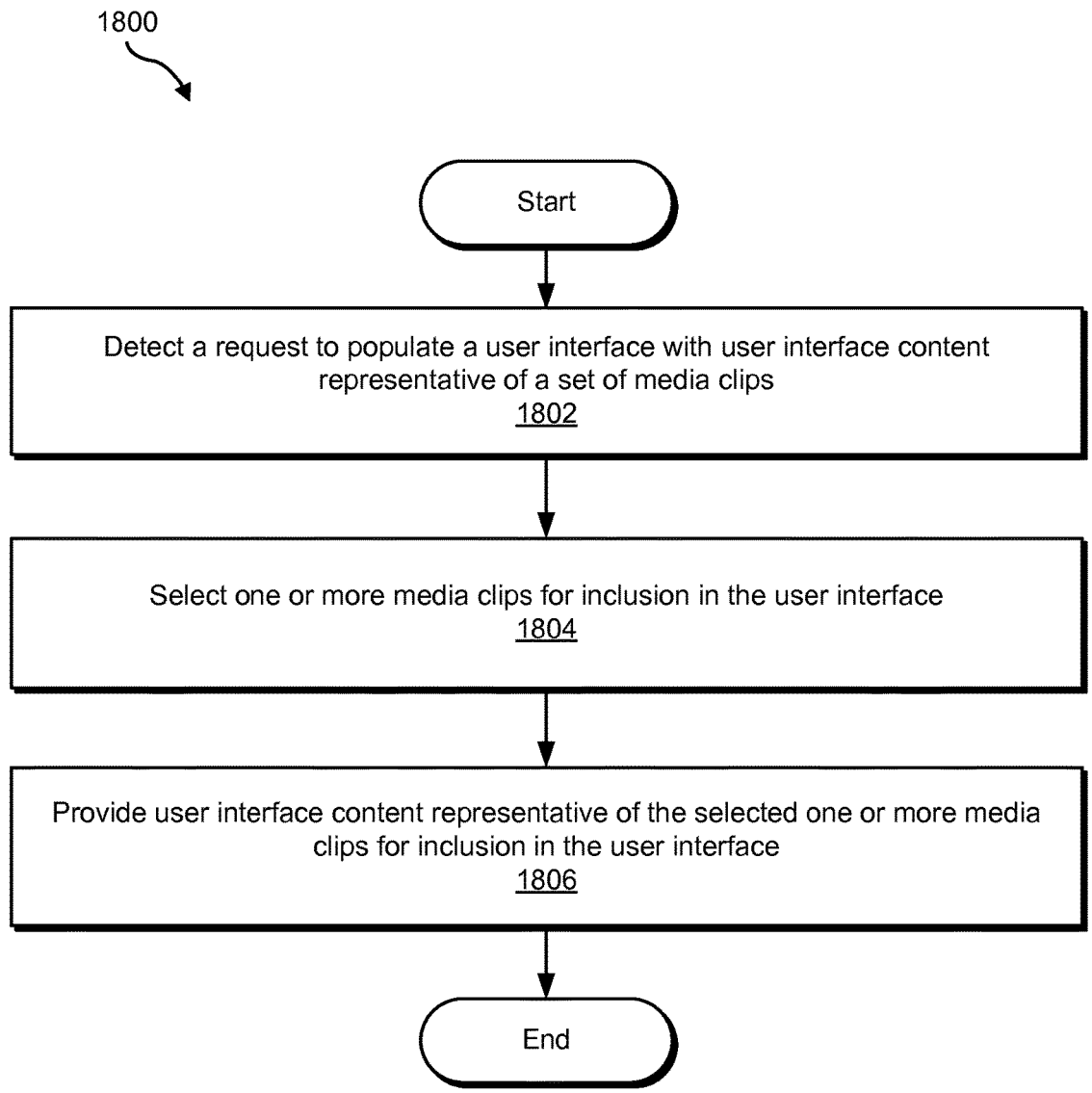

FIGS. 16-18 illustrate exemplary media clip methods 1600-1800. While FIGS. 16-18 illustrate exemplary steps according to certain embodiment, other embodiments may omit, add to, reorder, combine, and/or modify any of the steps shown in FIGS. 16-18. One or more of the steps shown in FIGS. 16-18 may be performed by system 100, system 1500, and/or any elements and/or implementations thereof.

Turning to method 1600, in step 1602, a system detects a user request to create a clip of a media program, such as described herein.

In step 1604, the system automatically creates the clip of the media program. The system may create the clip of the media program in any suitable away in response to the user request received in step 1602. For example, the system may automatically create the clip of the media program in accordance with method 1700 shown in FIG. 17 and/or without any additional user input from a user.

In step 1606, the system provides a media clip editing tool for use by a user to edit the clip of the media program. Step 1606 may be performed in any of the ways described herein. The media clip editing tool may include any of the exemplary media clip editing tools described herein.

In step 1608, the system detects a user request to share the clip of the media program, such as described herein.

In step 1610, the system provides a clip sharing tool for use by a user to share the clip of the media program. Step 1610 may be performed in any of the ways described herein. The media clip sharing tool may include any of the exemplary media clip sharing tools described herein.

Turning to method 1700, in step 1702, a system determines a playback time of a media program at which a user request to create a clip of a media program is detected, such as described herein.

In step 1704, the system selects a start time for the clip based on the determined playback time of the media program and on a predefined automatic start time selection setting, such as described herein.

In step 1706, the system selects an end time for the clip based on the determined playback time of the media program and on a predefined automatic end time selection setting, such as described herein.

In step 1708, the system generated data representative of the clip, such as described herein.

In step 1710, the system saves the data representative of the clip, such as described herein.

Turning to method 1800, in step 1802, a system detects a request to populate a user interface with user interface content representative of a set of media clips, such as described herein. The user interface may include a media service user interface or any GUI view of the media service user interface (e.g., a home page view of the media service user interface).

In step 1804, the system selects one or more media clips for inclusion in the user interface. The system may select the one or more media clips to include in the user interface based on any suitable predefined selection criteria. As described herein, in certain examples, the system may select the one or more media clips to include in the user interface from a plurality of media clips that have been defined by a user and saved to a user profile for the user.

In step 1806, the system provides user interface content representative of the selected one or more media clips for inclusion in the user interface, such as described herein. As described herein, the user interface content may be selected by a user to access any of the media clips represented in the user interface.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a Compact Disc Read-Only Memory ("CD-ROM"), a Digital Versatile Disc ("DVD"), any other optical medium, a Random-Access Memory ("RAM"), a Programmable ROM ("PROM"), an Erasable PROM ("EPROM"), a Flash Electrically EPROM ("FLASH-EEPROM"), any other memory chip or cartridge, or any other tangible medium from which a computer can read.

Figure 19:
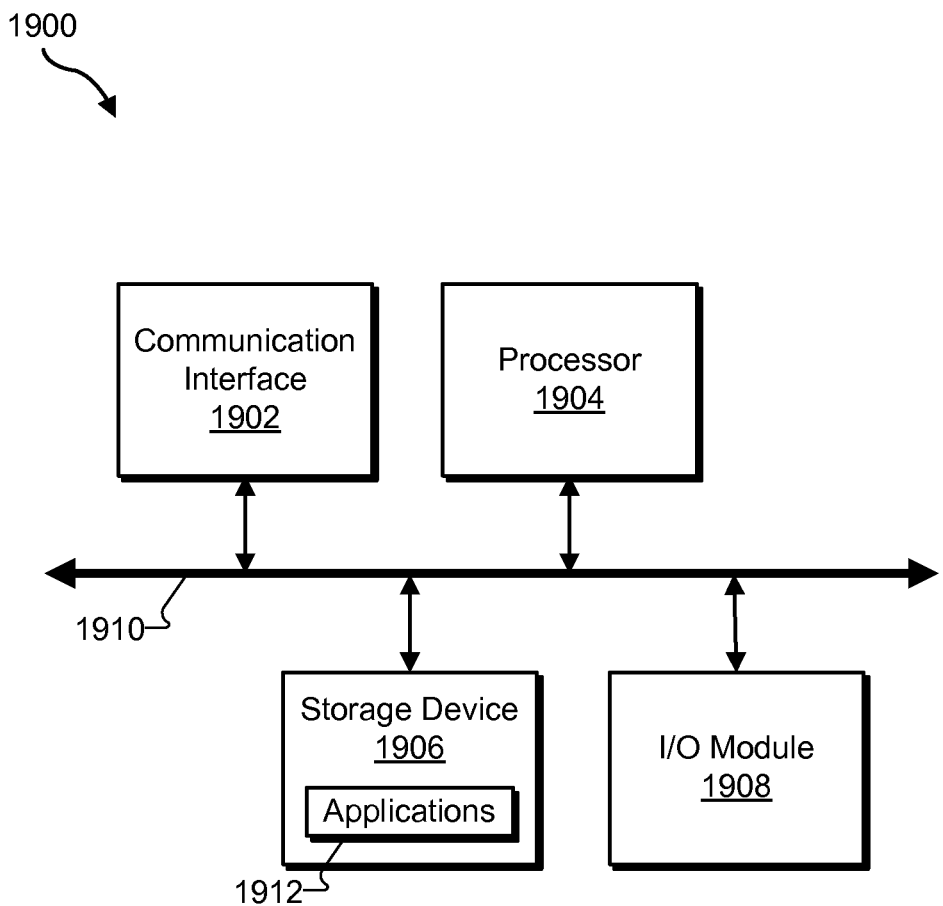
FIG. 19 illustrates an exemplary computing device according to principles described herein.

FIG. 19 illustrates an exemplary computing device 1900 that may be configured to perform one or more of the processes described herein. As shown in FIG. 19, computing device 1900 may include a communication interface 1902, a processor 1904, a storage device 1906, and an input/output ("I/O") module 1908 communicatively connected via a communication infrastructure 1910. While an exemplary computing device 1900 is shown in FIG. 19, the components illustrated in FIG. 19 are not intended to be limiting. Additional, fewer, or alternative components may be used in other embodiments. Components of computing device 1900 shown in FIG. 19 will now be described in additional detail.

Communication interface 1902 may be configured to communicate with one or more computing devices. Examples of communication interface 1902 include, without limitation, a wired network interface (such as a network interface card), a wireless network interface (such as a wireless network interface card), a modem, an audio/video connection, and any other suitable interface.

Processor 1904 generally represents any type or form of processing unit capable of processing data or interpreting, executing, and/or directing execution of one or more of the instructions, processes, and/or operations described herein. Processor 1904 may execute and/or direct execution of operations as directed by one or more applications 1912 or other computer-executable instructions such as may be stored in storage device 1906 or another computer-readable medium.

Storage device 1906 may include one or more data storage media, devices, or configurations and may employ any type, form, and combination of data storage media and/or device. For example, storage device 1906 may include, but is not limited to, a hard drive, network drive, flash drive, magnetic disc, optical disc, RAM, DRAM, other non-volatile and/or volatile data storage units, or a combination or sub-combination thereof. Electronic data, including data described herein, may be temporarily and/or permanently stored in storage device 1906. For example, data representative of one or more applications 1912 configured to direct processor 1904 to perform any of the operations described herein may be stored within storage device 1906. In some examples, data may be arranged in one or more databases residing within storage device 1906.

I/O module 1908 may be configured to receive user input and provide user output and may include any hardware, firmware, software, or combination thereof supportive of input and output capabilities. For example, I/O module 1908 may include hardware and/or software for capturing user input, including, but not limited to, a keyboard or keypad, a touch screen component (e.g., touch screen display), a receiver (e.g., a radio frequency ("RF") or infrared receiver), and/or one or more input buttons.

I/O module 1908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1908 is configured to provide graphical data to a display for presentation to a user. The graphical data may be representative of one or more GUI views and/or any other graphical content as may serve a particular implementation.

In some examples, any of the facilities described herein may be implemented by or within one or more components of computing device 1900. For example, one or more applications 1912 residing within storage device 1906 may be configured to direct processor 1904 to perform one or more processes or functions associated with clip management facility 102. Likewise, storage facility 104 may be implemented by or within storage device 1906. Such an implementation may be referred to as a computer-implemented system, such as a computer-implemented media clip system 100.

One or more of the systems, methods, elements, operations, features, tools, etc. described herein may improve operation and/or performance of computing device 1900, such as by conserving processing and/or memory resources of computing device 1900 and/or by providing for efficient operation of computing device 1900, for example.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
    detecting, by a media clip system during a playback of a media program, a user request to create a clip of the media program; and
    in response to the detecting of the user request to create the clip of the media program:
        determining, by the media clip system, a playback time of the media program at which the user request is detected,
        selecting, by the media clip system, a start time for the clip based on the playback time of the media program at which the user request is detected and on a predefined automatic start time selection setting,
        selecting, by the media clip system an end time for the clip based on the playback time of the media program at which the user request is detected and on a predefined automatic end time selection setting, and
        generating, by the media clip system, data representative of the clip, the data representative of the clip usable by a media player device to access and play back the clip of the media program;
    wherein:
        the predefined automatic start time selection setting specifies a predefined length of playback time by which to advance backward along a playback timeline from the playback time of the media program at which the user request is detected to identify the start time for the clip; and
        the selecting of the start time for the clip comprises
            identifying the start time for the clip by advancing, from the playback time of the media program at which the user request is detected, backward along the playback timeline by the predefined length of playback time, and
            designating the identified start time as the start time for the clip.

2. The method of claim 1, wherein:
    the predefined automatic end time selection setting specifies a predefined length of playback time by which to advance forward along the playback timeline from the playback time of the media program at which the user request is detected to identify the end time for the clip; and
    the selecting of the end time for the clip comprises
        identifying the end time for the clip by advancing, from the playback time of the media program at which the user request is detected, forward along the playback timeline by the predefined length of playback time, and
        designating the identified end time as the end time for the clip.

3. The method of claim 1, wherein the predefined automatic start time selection setting and the predefined automatic end time selection setting are defined by a provider of a media distribution service.

4. The method of claim 1, wherein the predefined automatic start time selection setting and the predefined automatic end time selection setting are custom defined by an end user of a media distribution service.

5. The method of claim 1, wherein the data representative of the clip comprises:
    an identifier for the media program;
    a start time offset indicating the start time of the clip within the media program; and
    an end time offset indicating the end time of the clip within the media program.

6. The method of claim 1, further comprising saving, by the media clip system, the generated data representative of the clip to a user profile of an end user of a media distribution service.

7. The method of claim 6, further comprising:
    detecting, by the media clip system, a request to populate a media service graphical user interface ("GUI") home page view with user interface content representative of a set of media clips that have been defined by the end user of the media distribution service;
    selecting, by the media clip system from data representative of a plurality of media clips saved to the user profile of the end user of the media distribution service, one or more of the media clips represented in the user profile for inclusion in the media service GUI home page view; and
    providing, by the media clip system, user interface content representative of the selected one or more of the media clips for inclusion in the media service GUI home page view.

8. The method of claim 1, further comprising providing, by the media clip system in a graphical user interface view, a media clip editing tool comprising:
    a start time handle movable along a linear array of still-frame images of the media program by touch screen user input to adjust the start time of the clip; and
    an end time handle movable along the linear array of still-frame images by touch screen user input to adjust the end time of the clip.

9. The method of claim 8, further comprising graphically limiting, by the media clip system in the graphical user interface, a playback time length between the start time handle and the end time handle to prevent the playback time length between the start time handle and the end time handle from exceeding a maximum media clip playback time threshold.

10. The method of claim 1, further comprising:
    detecting, by the media clip system, a user request to share the clip of the media program; and
    providing, by the media clip system in response to the detecting of the user request to share the clip of the media program, a menu of communication platform options selectable by a user to indicate a communication platform to use to share the clip of the media program.

11. The method of claim 1, embodied as computer-executable instructions on at least one non-transitory computer-readable medium.

12. A method comprising:
  detecting, by a media clip system during a playback of a media program, a user request to create a clip of the media program; and
  in response to the detecting of the user request to create the clip of the media program:
    determining, by the media clip system, a playback time of the media program at which the user request is detected,
    selecting, by the media clip system, a start time for the clip based on the playback time of the media program at which the user request is detected and on a predefined automatic start time selection setting,
    selecting, by the media clip system, an end time for the clip based on the playback time of the media program at which the user request is detected and on a predefined automatic end time selection setting, and
    generating, by the media clip system, data representative of the clip, the data representative of the clip usable by a media player device to access and play back the clip of the media program;
  wherein:
    the predefined automatic start time selection setting comprises a start scene boundary selection setting usable to identify a start scene boundary in the media program that is earlier in time than the playback time of the media program at which the user request is detected;
    the predefined automatic end time selection setting comprises an end scene boundary selection setting usable to identify an end scene boundary in the media program that is later in time than the playback time of the media program at which the user request is detected;
    the selecting of the start time for the clip comprises
      identifying, based on the start scene boundary selection setting, the start scene boundary in the media program that is earlier in time than the playback time of the media program at which the user request is detected, and
      designating the identified start scene boundary as the start time for the clip; and
    the selecting of the end time for the clip comprises
      identifying, based on the end scene boundary selection setting, the end scene boundary in the media program that is later in time than the playback time of the media program at which the user request is detected, and
      designating the identified end scene boundary as the end time for the clip.

13. A method comprising:
  providing, by a mobile television distribution service system, a media program to a personal mobile device associated with an end user of a mobile television distribution service;
  detecting, by the mobile television distribution service system, during a playback of the media program by the personal mobile device, a user request to create a clip of the media program; and
  in response to the detecting of the user request to create the clip of the media program:
    determining, by the mobile television distribution service system, a playback time of the media program at which the user request is detected,
    selecting, by the mobile television distribution service system, a start time for the clip based on the playback time of the media program at which the user request is detected and on a predefined automatic start time selection setting,
    selecting, by the mobile television distribution service system, an end time for the clip based on the playback time of the media program at which the user request is detected and on a predefined automatic end time selection setting,
    generating, by the mobile television distribution service system, data representative of the clip, and
    saving, by the mobile television distribution service system, the generated data representative of the clip to a user profile of the end user of the mobile television distribution service;
  wherein:
    the predefined automatic start time selection setting specifies a predefined length of playback time by which to advance backward along a playback timeline from the playback time of the media program at which the user request is detected to identify the start time for the clip; and
    the selecting of the start time for the clip comprises
      identifying the start time for the clip by advancing, from the playback time of the media program at which the user request is detected, backward along the playback timeline by the predefined length of playback time, and
      designating the identified start time as the start time for the clip.

14. The method of claim 13, further comprising:
  detecting, by the mobile television distribution service system, a request to populate a mobile television service graphical user interface ("GUI") home page view with user interface content representative of a set of media clips that have been defined by the end user of the mobile television distribution service;
  selecting, by the mobile television distribution service system from data representative of a plurality of media clips saved to the user profile of the end user of the mobile television distribution service, one or more of the media clips represented in the user profile for inclusion in the mobile television service GUI home page view; and
  providing, by the mobile television distribution service system, user interface content representative of the selected one or more of the media clips for inclusion in the mobile television service GUI home page view.

15. The method of claim 13, embodied as computer-executable instructions on at least one non-transitory computer-readable medium.

16. A system comprising:
  at least one physical computing device that:
  detects, during a playback of a media program, a user request to create a clip of the media program; and
  in response to the detecting of the user request to create the clip of the media program:
    determines a playback time of the media program at which the user request is detected,
    selects a start time for the clip based on the playback time of the media program at which the user request is detected and on a predefined automatic start time selection setting,
    selects an end time for the clip based on the playback time of the media program at which the user request is detected and on a predefined automatic end time selection setting, and generates data representative of the clip, the data representative of the clip usable by a media player device to access and play back the clip of the media program;

wherein:
the predefined automatic start time selection setting specifies a predefined length of playback time by which to advance backward along a playback timeline from the playback time of the media program at which the user request is detected to identify the start time for the clip;

the at least one physical computing device selects the start time for the clip by
identifying the start time for the clip by advancing, from the playback time of the media program at which the user request is detected, backward along the playback timeline by the predefined length of playback time, and
designating the identified start time as the start time for the clip.

17. The system of claim 16, wherein:
the predefined automatic end time selection setting specifies a predefined length of playback time by which to advance forward along the playback timeline from the playback time of the media program at which the user request is detected to identify the end time for the clip; and
the at least one physical computing device selects the end time for the clip by
identifying the end time for the clip by advancing, from the playback time of the media program at which the user request is detected, forward along the playback timeline by the predefined length of playback time, and
designating the identified end time as the end time for the clip.

18. The system of claim 16, wherein the at least one physical computing device saves the generated data representative of the clip to a user profile of an end user of a media distribution service.

19. The system of claim 18, wherein the at least one physical computing device:
detects a request to populate a media service graphical user interface ("GUI") home page view with user interface content representative of a set of media clips that have been defined by the end user of the media distribution service,
selects, from data representative of a plurality of media clips saved to the user profile of the end user of the media distribution service, one or more of the media clips represented in the user profile for inclusion in the media service GUI home page view, and
provides user interface content representative of the selected one or more of the media clips for inclusion in the media service GUI home page view.

20. A system comprising:
at least one physical computing device that:
detects, during a playback of a media program, a user request to create a clip of the media program; and
in response to the detecting of the user request to create the clip of the media program:
determines a playback time of the media program at which the user request is detected,
selects a start time for the clip based on the playback time of the media program at which the user request is detected and on a predefined automatic start time selection setting,
selects an end time for the clip based on the playback time of the media program at which the user request is detected and on a predefined automatic end time selection setting, and
generates data representative of the clip, the data representative of the clip usable by a media player device to access and play back the clip of the media program;

wherein:
the predefined automatic start time selection setting comprises a start scene boundary selection setting usable to identify a start scene boundary in the media program that is earlier in time than the playback time of the media program at which the user request is detected;
the predefined automatic end time selection setting comprises an end scene boundary selection setting usable to identify an end scene boundary in the media program that is later in time than the playback time of the media program at which the user request is detected;
the at least one physical computing device selects the start time for the clip by
identifying, based on the start scene boundary selection setting, the start scene boundary in the media program that is earlier in time than the playback time of the media program at which the user request is detected, and
designating the identified start scene boundary as the start time for the clip; and
the at least one physical computing device selects the end time for the clip by
identifying, based on the end scene boundary selection setting, the end scene boundary in the media program that is later in time than the playback time of the media program at which the user request is detected, and
designating the identified end scene boundary as the end time for the clip.

* * * * *